United States Patent [19]
Hayashi et al.

[11] Patent Number: 5,630,018
[45] Date of Patent: May 13, 1997

[54] FUZZY INFERENCE DEVICE USING NEURAL NETWORK

[75] Inventors: Isao Hayashi, Osaka; Noboru Wakami, Hirakata; Hiroyoshi Nomura, Neyagawa, all of Japan

[73] Assignee: Matsushita Electric Industrial Co., Ltd., Osaka-fu, Japan

[21] Appl. No.: 265,617

[22] Filed: Jun. 24, 1994

Related U.S. Application Data

[63] Continuation-in-part of Ser. No. 683,179, Apr. 9, 1991, abandoned.

[30]  Foreign Application Priority Data

Apr. 9, 1990 [JP] Japan .................................. 2-93632

[51] Int. Cl.$^6$ ..................................................... G06F 9/44
[52] U.S. Cl. ................... 395/22; 395/3; 395/900
[58] Field of Search ........................ 395/22, 3, 900

[56]  References Cited

U.S. PATENT DOCUMENTS

| | | | |
|---|---|---|---|
| 4,954,963 | 9/1990 | Penz et al. | 395/23 |
| 5,023,045 | 6/1991 | Watanabe et al. | 395/22 |
| 5,040,215 | 8/1991 | Amano et al. | 381/43 |
| 5,046,019 | 9/1991 | Basehove | 395/27 |
| 5,052,043 | 9/1991 | Gaborski | 395/23 |
| 5,255,344 | 10/1993 | Takagi et al. | 395/3 |

FOREIGN PATENT DOCUMENTS

| | | |
|---|---|---|
| 0376689 | 7/1990 | European Pat. Off. . |
| 8911684 | 11/1989 | Japan . |

OTHER PUBLICATIONS

"Revised GMDH Algorithm Estimating Degree of the Complete Polynomial", Tadashi Kondo, pp. 8–14.

"Fuzzy Modelling", Geun–Taek Kang et al., Society of Instrument and Control Engineers Papers, vol. 23, No. 6, pp. 650–652, 1987, 106–108.

T. Iwata et al., "Fuzzy Control Using Neural Network Techniques", International Joint Conference On Neural Networks 17 Jun. 1990, San Diego, CA, pp. III–365 –III–370.

N. Giambiasi et al., "Une Approche Connexionniste Pour Calculer L'Implication Floue Dans Les Systemes A base De Regles", International Workshop Of Neural Networks & Their Applications, 13 Nov. 1989, NY, pp. 143–158.

Iwata et al, "Fuzzy Control Using Neural Network Techniques", IWNN and their Application, Nov. 1989.

"Fuzzy Logic/Neural System Approach to Signal Processing in Large Scale Design Systems", Tacker et al, 1989 IEEE.

*Primary Examiner*—George B. Davis
*Attorney, Agent, or Firm*—Wenderoth, Lind & Ponack

[57]  ABSTRACT

A fuzzy inference device determines an inference operational quantity in accordance with inference rules each constituted by an antecedent and a consequent. An inference rule division determiner which receives data of input variables and output variables so as to determine the number of the inference rules. An antecedent neural element obtains a membership value corresponding to an antecedent of a specific inference rule from the divided data of the input variables and the output variables. A situational change processor adaptively determines an inference quantity of a consequent of each inference rule in the case of a change of an initial state or inference situations. An inference operational quantity determiner receives outputs from the antecedent neural element and the situational change processor and performs fuzzy inference in accordance with the inference rules so as to determine the inference operational quantity. An evaluator evaluates, on the basis of an evaluation reference, the inference operational quantity outputted by the inference operational quantity determiner.

2 Claims, 14 Drawing Sheets

Fig. 6  PRIOR ART

| IDENTIFICATION DATA ||||||  EVALUATION DATA ||||||
|---|---|---|---|---|---|---|---|---|---|---|---|
| No | y | $X_1$ | $X_2$ | $X_3$ | $X_4$ | No | y | $X_1$ | $X_2$ | $X_3$ | $X_4$ |
| 1 | 11.110 | 1 | 3 | 1 | 1 | 21 | 9.545 | 1 | 1 | 5 | 1 |
| 2 | 6.521 | 1 | 5 | 2 | 1 | 22 | 6.043 | 1 | 3 | 4 | 1 |
| 3 | 10.190 | 1 | 1 | 3 | 5 | 23 | 5.724 | 1 | 5 | 3 | 5 |
| 4 | 6.043 | 1 | 3 | 4 | 5 | 24 | 11.250 | 1 | 1 | 2 | 5 |
| 5 | 5.242 | 1 | 5 | 5 | 1 | 25 | 11.110 | 1 | 3 | 1 | 1 |
| 6 | 19.020 | 5 | 1 | 4 | 1 | 26 | 14.360 | 5 | 5 | 2 | 1 |
| 7 | 14.150 | 5 | 3 | 3 | 5 | 27 | 19.610 | 5 | 1 | 3 | 5 |
| 8 | 14.360 | 5 | 5 | 2 | 5 | 28 | 13.650 | 5 | 3 | 4 | 5 |
| 9 | 27.420 | 5 | 1 | 1 | 1 | 29 | 12.430 | 5 | 5 | 5 | 1 |
| 10 | 15.390 | 5 | 3 | 2 | 1 | 30 | 19.020 | 5 | 1 | 4 | 1 |
| 11 | 5.724 | 1 | 5 | 3 | 5 | 31 | 6.380 | 1 | 3 | 3 | 5 |
| 12 | 9.766 | 1 | 1 | 4 | 5 | 32 | 6.521 | 1 | 5 | 2 | 5 |
| 13 | 5.8700 | 1 | 3 | 5 | 1 | 33 | 16.000 | 1 | 1 | 1 | 1 |
| 14 | 5.406 | 1 | 5 | 4 | 1 | 34 | 7.219 | 1 | 3 | 2 | 1 |
| 15 | 10.190 | 1 | 1 | 3 | 5 | 35 | 5.724 | 1 | 5 | 3 | 5 |
| 16 | 15.390 | 5 | 3 | 2 | 5 | 36 | 19.020 | 5 | 1 | 4 | 5 |
| 17 | 19.680 | 5 | 5 | 1 | 1 | 37 | 13.390 | 5 | 3 | 5 | 1 |
| 18 | 21.060 | 5 | 1 | 2 | 1 | 38 | 12.680 | 5 | 5 | 4 | 1 |
| 19 | 14.150 | 5 | 3 | 3 | 5 | 39 | 19.610 | 5 | 1 | 3 | 5 |
| 20 | 12.680 | 5 | 5 | 4 | 5 | 40 | 15.390 | 5 | 3 | 2 | 5 |

Fig. 7 PRIOR ART

| IDENTIFICATION DATA | | | | MEMBERSHIP VALUE | |
|---|---|---|---|---|---|
| No. | $X_1$ | $X_2$ | $X_3$ | RULE 1 | RULE 2 |
| 1 | 1 | 3 | 1 | 0.9970 | 0.0031 |
| 2 | 1 | 5 | 2 | 0.9972 | 0.0028 |
| 3 | 1 | 1 | 3 | 0.9972 | 0.0028 |
| 4 | 1 | 3 | 4 | 0.9973 | 0.0027 |
| 5 | 1 | 5 | 5 | 0.9974 | 0.0026 |
| 6 | 5 | 1 | 4 | 0.0028 | 0.9971 |
| 7 | 5 | 3 | 3 | 0.0028 | 0.9972 |
| 8 | 5 | 5 | 2 | 0.0027 | 0.9972 |
| 9 | 5 | 1 | 1 | 0.0027 | 0.9973 |
| 10 | 5 | 3 | 2 | 0.0027 | 0.9973 |
| 11 | 1 | 5 | 3 | 0.9973 | 0.0028 |
| 12 | 1 | 1 | 4 | 0.9973 | 0.0027 |
| 13 | 1 | 3 | 5 | 0.9974 | 0.0026 |
| 14 | 1 | 5 | 4 | 0.9973 | 0.0027 |
| 15 | 1 | 1 | 3 | 0.9972 | 0.0028 |
| 16 | 5 | 3 | 2 | 0.0027 | 0.9973 |
| 17 | 5 | 5 | 1 | 0.0027 | 0.9973 |
| 18 | 5 | 1 | 2 | 0.0027 | 0.9973 |
| 19 | 5 | 3 | 3 | 0.0028 | 0.9972 |
| 20 | 5 | 5 | 4 | 0.0029 | 0.9971 |

Fig. 8 PRIOR ART

| | IDENTIFICATION DATA | | | | | | EVALUATION DATA | | | |
|---|---|---|---|---|---|---|---|---|---|---|
| No. | y | y* | $W_1^1$ | $W_1^2$ | | No. | y | y* | $W_1^1$ | $W_1^2$ |
| 1 | 11.110 | 11.136 | 0.9970 | 0.0031 | | 21 | 9.545 | 8.882 | 0.9974 | 0.0027 |
| 2 | 6.521 | 6.534 | 0.9972 | 0.0028 | | 22 | 6.043 | 6.140 | 0.9973 | 0.0027 |
| 3 | 10.190 | 10.210 | 0.9972 | 0.0028 | | 23 | 5.724 | 5.712 | 0.9973 | 0.0028 |
| 4 | 6.043 | 6.140 | 0.9973 | 0.0027 | | 24 | 11.250 | 10.547 | 0.9971 | 0.0030 |
| 5 | 5.242 | 5.370 | 0.9974 | 0.0026 | | 25 | 11.110 | 11.136 | 0.9970 | 0.0031 |
| 6 | 19.020 | 18.995 | 0.0028 | 0.9971 | | 26 | 14.360 | 14.334 | 0.0027 | 0.9972 |
| 7 | 14.150 | 14.134 | 0.0028 | 0.9972 | | 27 | 19.610 | 19.061 | 0.0028 | 0.9972 |
| 8 | 14.360 | 14.334 | 0.0027 | 0.9972 | | 28 | 13.650 | 13.918 | 0.0029 | 0.9971 |
| 9 | 27.420 | 27.373 | 0.0027 | 0.9973 | | 29 | 12.430 | 12.293 | 0.0030 | 0.9969 |
| 10 | 15.390 | 15.383 | 0.0027 | 0.9973 | | 30 | 19.020 | 18.995 | 0.0028 | 0.9971 |
| 11 | 5.724 | 5.712 | 0.9973 | 0.0028 | | 31 | 6.380 | 7.178 | 0.9972 | 0.0028 |
| 12 | 9.766 | 9.791 | 0.9973 | 0.0027 | | 32 | 6.521 | 6.534 | 0.9972 | 0.0028 |
| 13 | 5.8700 | 5.747 | 0.9974 | 0.0026 | | 33 | 16.000 | 11.239 | 0.9969 | 0.0032 |
| 14 | 5.406 | 5.450 | 0.9973 | 0.0027 | | 34 | 7.219 | 9.018 | 0.9971 | 0.0029 |
| 15 | 10.190 | 10.210 | 0.9972 | 0.0028 | | 35 | 5.724 | 5.712 | 0.9973 | 0.0028 |
| 16 | 15.390 | 15.383 | 0.0027 | 0.9973 | | 36 | 19.020 | 18.995 | 0.0028 | 0.9971 |
| 17 | 19.680 | 19.652 | 0.0027 | 0.9973 | | 37 | 13.390 | 13.892 | 0.0030 | 0.9970 |
| 18 | 21.060 | 21.046 | 0.0027 | 0.9973 | | 38 | 12.680 | 12.672 | 0.0029 | 0.9971 |
| 19 | 14.150 | 14.134 | 0.0028 | 0.9972 | | 39 | 19.610 | 19.061 | 0.0028 | 0.9972 |
| 20 | 12.680 | 12.672 | 0.0029 | 0.9971 | | 40 | 15.390 | 15.383 | 0.0027 | 0.9973 |

FUZZY INFERENCE DEVICE USING NEURAL NETWORK

This application is a continuation-in-part of application Ser. No. 07/683,179, filed Apr. 9, 1991, now abandoned.

BACKGROUND OF THE INVENTION

The present invention relates to an inference device which determines an estimated quantity such as control quantity from input data or which conducts a membership estimation in pattern recognition.

In a control system a final inference operational quantity may be determined using indefinite variables judged sensuously by an operator, for example, "big", "medium", etc. An inference device based on fuzzy inference employs fuzzy variables as indefinite variables in an inference rule of the "IF—THEN—" type.

FIG. 5 shows one exampiLe of fuzzy variables. In FIG. 5, NB denotes Negative Big, NM denotes Negative Medium, NS denotes Negative Small, ZO denotes Zero, PS denotes Positive Small, PM denotes Positive Medium and PB denotes Positive Big. In fuzzy inference, a fuzzy variable is always written in an antecedent (IF part) of the inference rule, while a fuzzy variable or an equation is written in a consequent (THEN part) of the inference rule. When a real number or a fuzzy number is inputted, as data, to the inference device in the case where the fuzzy variable is written in the consequent, the inference device calculates the degree of matching (membership value) between the real number or the fuzzy number and a membership function indicative of the fuzzy variable of the antecedent and determines an output fuzzy number of the consequent through a plurality of processings of the degree of matching. It is possible to obtain an actual operational quantity by taking a value of center of gravity, etc. of output fuzzy numbers based on a plurality of rules. Meanwhile, in the case where the equation is written in the consequent, the actual operational quantity can be obtained without performing the processing of taking the value of center of gravity, etc.

One of the conventional inference methods using this fuzzy inference is fuzzy modelling disclosed, for example, by Geun-Taek Kang and Michio Sngeno in a paper entitled "Fuzzy modelling" of SOCIETY OF INSTRUMENT AND CONTROL ENGINEERS PAPERS, Vol. 23, No. 6, pp. 650–652, 1987.

On the other hand, a method of and a device for automatically determining the membership function indicative of the fuzzy number and shape of the inference rule by introducing the learning property of a neural network into fuzzy modelling are proposed in U.S. patent application Ser. No. 459,815 by two inventors including one of the present inventors. This method is a kind of fuzzy modelling, but is different from fuzzy modelling in that the learning property of the neural network is introduced thereinto. The neural network is a mathematical network which simulates connection of cranial nerve cells. In the neural network, a nonlinear problem can be solved by sequentially determining the strength of connection among units constituting the neural network.

FIG. 12 shows one example of known fuzzy inference devices. The known fuzzy inference device includes inference rule executors 1201 to 120r provided for inference rules, respectively, and an inference operational quantity determiner 1203 for determining a final inference operational quantity from estimated values obtained for the inference rules, respectively. Each of the inference rule executors 1201 to 120r is constituted by two portions. Namely, the inference rule executors 1201 to 120r include membership value estimators 1211 to 121r for identifying antecedents of the inference rules and inference operational quantity estimators 1221 to 122r for identifying consequents of the inference rules.

As shown in FIG. 9, the membership value estimators 1211 to 121r and the inference operational quantity estimators 1221 to 122r have the structure of a multilayered network. In FIG. 9, reference numeral 91 denotes a multi-input/multi-output signal processor and reference numeral 92 denotes an input terminal of the neural network model. For each of the inference rules, each of the membership value estimators 1211 to 121r and each of the inference operational quantity estimators 1221 to 122r shown in FIG. 12 identify structures of the antecedent and the consequent, respectively, and obtains from a given input value, a variable of a formula indicative of an estimated value of the membership value of the antecedent and an inference operational quantity of the consequent. In accordance with each inference rule thus obtained, the inference operational quantity determiner 1203 determines the final inference operational quantity.

One example of the operation of the known fuzzy inference device of FIG. 12 is described by using numerals indicated by Tadashi Kondo in a paper entitled "Revised GMDH Algorithm Estimating Degree of the Complete Polynomial" of SOCIETY OF INSTRUMENT AND CONTROL ENGINEERS PAPERS, Vol. 22, No. 9, pp. 928–934, 1986. The calculation algorithm is as follows.

[Step 1]

Input variables $x_{ij}$ (j=1, 2, —, m) associated with observations $y_i$ (i=1, 2, —, n) are determined. If necessary, the input/output data $(x_i, y_i)$ is normalized. FIG. 6 shows the input/output data $(x_i, y_i)$.

[Step 2]

The input/output data $(x_i, y_i)$ is divided into data for identifying a structure for model estimation (hereinbelow, referred to as "training data" (TRD) of $n_t$ in number) and data for evaluating an estimated model (hereinbelow, referred to as "checking data" (CHD) of $n_c$ in number such that the numbers $n_t$ and $n_c$ satisfy the relation of $(n=n_t+n_c)$). In FIG. 6, data numbered 1 to 20 is the training data, while data numbered 21 to 40 is the checking data. Thus, $n_t=n_c=20$ and m=4.

[Step 3]

By using clustering technique, the training data is divided into r portions in an optimum manner. Character $R^s$ (s=1, 2, —, r) denotes each of r divisions of learning data and character $(x_i^s, y_i^s)$ (i=1, 2, —, $(nt)^s$) denotes contents of the learning data $R^s$ where $(nt)^s$ is the number of the training data in each learning data $R^s$. In this example, the natural number r is 2 and thus, a four-dimensional space acting as space for input variables is divided into two portions.

[Step 4]

At this step, a structure of the antecedent is identified. To this end, $x_i$ is allocated to an input value of an input layer, while $W_i^s$ is allocated to an output value of an output layer. The output value $W_i^s$ assumes 1 and 0 when the input value $x_i$ belongs to the learning data $R^s$ and does not belong to the learning data $R^s$ respectively for i=1, 2, —, n and s=1, 2, —, r.

A neural network for estimating the output value $W_i^s$ by learning is identified. At this time, an estimated value of the degree $W_i^s$ to which the learning data $(x_i, y_i)$ belongs to the learning data $R^s$ is defined as a membership value of the antecedent. By using the three-layered neural network, learning is performed 5,000 times so as to obtain a fuzzy number of the antecedent. The fuzzy number of the antecedent for the learning data $R^s$ at this time is expressed by As. FIG. 7 shows the membership values of the fuzzy numbers As.

[Step 5]

Each evaluation data $(x_i, y_i)$ $(i=1, 2, \ldots, n_c)$ of the checking data is substituted for the neural network obtained at step 4 by using the following equation:

$$W_i^s = \mu_{AS}(x_i) \text{ for } i=1, 2, \ldots, n_c$$

where character $\mu$ denotes a membership function.

[Step 6]

At this step, a structure of the consequent is identified. A structure model of the consequent corresponding to each rule is expressed by the input/output relation of the neural network. The input values $x_{i1}, x_{i2}, \ldots, x_{im}$ $(i=1, 2, \ldots, (n_r)^s)$ and the output value yi are allocated to the neural network so as to estimate the output value. The input values $x_{i1}, x_{i2}, \ldots, x_{im}$ $(i=1, 2, \ldots, n_c)$ of the checking data are substituted for the learned neural network so as to obtain a sum $\theta_p$ of squares of error by the following equation:

$$\theta_p = \Sigma_i (y_i - ey_i)^2$$

where character $ey_i$ denotes an estimated value.

This sum $\theta_p$ is used as an input variable and a rule for stopping algorithm.

[Step 7]

By using a variable reduction method, the input variables are reduced. An arbitrary one of the input variables is removed in each inference rule such that the neural network is identified by using the training data in the same manner as step 6. Subsequently, a sum $\theta_{p+1}$ of squares of estimated error of an inference operational quantity in the case of the use of the checking data is calculated. In the case of the following equation (1) at this time, since it is considered that the importance of the removed input variable x is low, the removed input variable x is cancelled.

$$\theta_p > \theta_{p+1} \qquad (1)$$

[Step 8]

Thereafter, steps 6 to 7 are repeated and the calculation is stopped until the equation (1) is not established for the whole input variables. A model which minimizes the value $\theta$ is an optimum neural network. The obtained fuzzy inference rules are given as follows.

$R^1$: IF $x=(x_1,x_2,x_3)$ is $A_1$, THEN $y^1=NN_1(x_1, x_2, x_3)$
$R^2$: IF $x=(x_1,x_2,x_3)$ is $A_2$, THEN $y^2=NN_2(x_2,x_3)$

In the above fuzzy inference rules, the equation $y=NN(x)$ represents the input/output relation of the neural network for each rule employed at the time of identification of the structure of the consequent.

By steps 1 to 8, the antecedent and the consequent of each inference rule are identified and thus, identification of the structure of the fuzzy model is completed. The inference operational quantity $y_i^*$ is given by the following equation (2):

$$y_i^* = (_s \Sigma W_i^s 33 \, my_i^s) / _s \Sigma W_i^s \text{ for } i=1, 2, \ldots, n \qquad (2)$$

where character $my_i^s$ denotes an estimated value given from an optimum neural network obtained at step 7. FIG. 8 shows the inference operational quantity $y_i^*$ of the equation (2).

As described above, in known fuzzy inference employing the neural network, the inference rules can be obtained easily by utilizing the learning property of the neural network without employing a method of discovery.

However, in the known .inference device employing the neural network, the consequent of the fuzzy inference rule is fixed by the inference operational quantity estimators 1221 to 122r. Thus, even if inference situations change, the known inference device does not have a function of changing the inference operational quantity according to a change of the inference situations.

Furthermore, the known inference device has such a drawback in that since the structures of the antecedent and the consequent are identified by the neural network, all parameters to be determined in the neural network should be stored, thereby resulting in tremendously large memory capacity.

Therefore, the known inference device employing the neural network does not have an algorithm of redetermining the structures of the antecedent and the consequent according to a change of the inference situations once the structures of the antecedent and the consequent have been determined by using the neural network. As a result, in order to redetermine the structures of the antecedent and the consequent, the algorithm should be started again and thus, it is impossible to rapidly determine the inference operational quantity according to a change of the inference situations.

SUMMARY OF THE INVENTION

Accordingly, an essential object of the present invention is to provide, with a view to eliminating the disadvantages inherent in conventional fuzzy inference devices, a fuzzy inference device in which the structure of a consequent is determined by using a nonlinear search algorithm, in which even if inference situations change, inference rules can follow the changing inference situations, and which rapidly responds to the changing inference situations and reduces the memory capacity.

A fuzzy inference dewice according to a first embodiment of the present invention learns inference rules on the basis of an evaluation function in accordance with a change of inference situations.

In a fuzzy inference device according to a second embodiment of the present invention, the inference rules are learned in the same manner as the first embodiment but the arrangement of an antecedent of each inference rule is different from that of the first embodiment.

Meanwhile, a fuzzy inference device according to a third embodiment of the present invention learns the inference rules on the basis of right input/output data (teacher's data) in accordance with a change of the inference situations.

Furthermore, in a fuzzy inference device according to a fourth embodiment of the present invention, the inference rules are learned in the same manner as the third embodiment, but the arrangement of the antecedent of each inference rule is different from that of the third embodiment.

In order to accomplish the objects of the present invention, a fuzzy inference device for determining an inference operational quantity in accordance with inference rules each constituted by an antecedent and a consequent, according to a first embodiment of the present invention comprises: an inference rule division determiner which receives data of input variables and output variables so as to determine the number of the inference rules; an antecedent neural element for obtaining a membership value corresponding to an antecedent of a specific inference rule from the divided data of the input variables and the output variables; a situational change processor for adaptively determining an inference quantity of a consequent of each inference rule in the case of a change of an initial state or inference situations; an inference operational quantity determiner which receives outputs from said antecedent neural element and said situational change processor and performs fuzzy inference in accordance with the inference rules so as to determine the inference operational quantity; and an evaluator for evaluating, on the basis of an evaluation reference, the inference operational quantity outputted by said inference operational quantity determiner; said situational change processor including an initialization determiner for initializing the inference quantity of the consequent by using an output value of said inference rule division determiner and a parameter searcher which begins a search from an output of said initialization determiner so as to search for an optimum parameter of the consequent in accordance with an output of said evaluator.

By the above described arrangement of the fuzzy inference device of the present invention, the structure of the antecedent of each fuzzy inference rule written in the form "IF—THEN—" is identified by using nonlinear characteristics of a neural network and an optimum parameter of the consequent of each fuzzy inference rule is determined by a nonlinear search method.

Consequently, in accordance with the present invention, the inference operatio:nal quantity can be flexibly adapted to changing inference situations at high speed and with reduced memory capacity.

BRIEF DESCRIPTION OF THE DRAWINGS

This object and features of the present invention will become apparent from the following description taken in conjunction with the preferred embodiments thereof with reference to the accompanying drawings, in which:

FIG. 6 illustrates input/output data of a prior art fuzzy inference device;

FIG. 7 illustrates a membership value of each learning data in the prior art fuzzy inference device of FIG. 6;

FIG. 8 illustrates results of estimation of an inference operational quantity in the fuzzy inference device of FIG. 6;

DETAILED DESCRIPTION OF THE INVENTION

Figure 1:
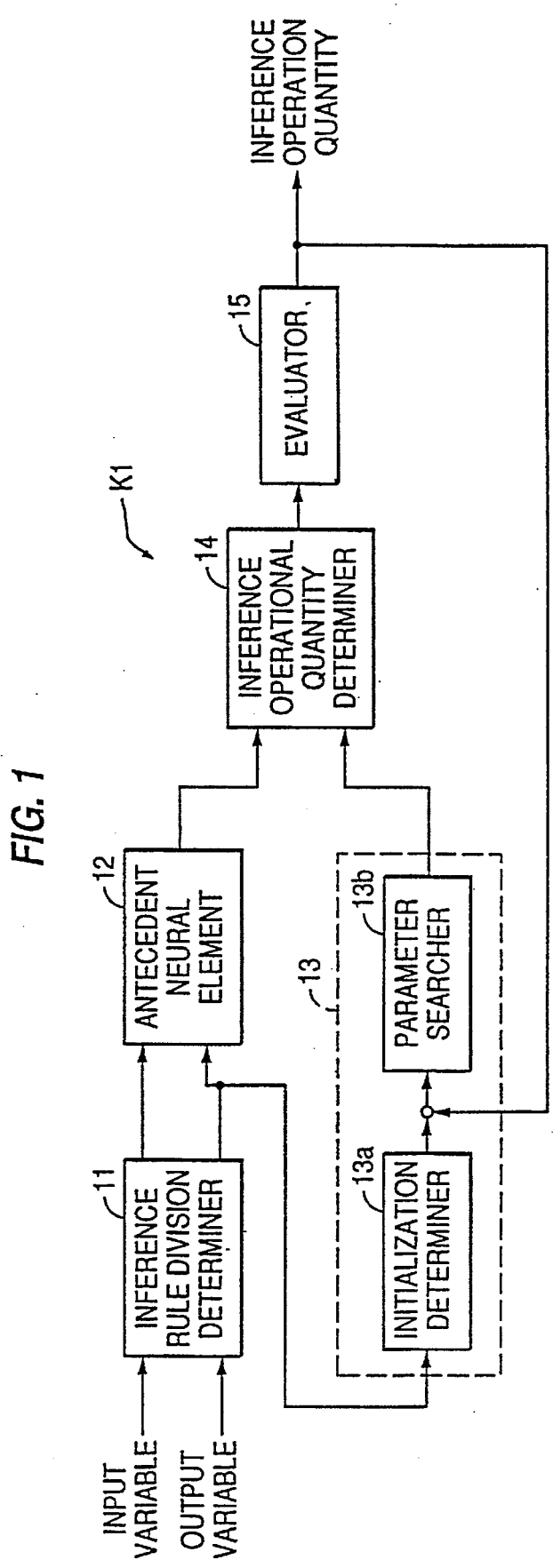
FIG. 1 is a block diagram of a fuzzy inference device according to a first embodiment of the present invention.

Referring now to the drawings, there is shown in FIG. 1, a fuzzy inference device K1 according to a first embodiment of the present invention. The device K1 includes an inference rule division determiner 11 which receives data of input variables and output variables so as to determine the number of inference rules and an antecedent neural element 12 for obtaining a membership value corresponding to an antecedent of a specific inference rule from the divided data of the input and output variables by using a neural network. The device K1 further includes a situational change processor 13 for adaptively determining an inference quantity of a consequent of each inference rule in the case of a change of an initial state or inference situations, an inference operational quantity determiner 14 which receives outputs from the antecedent neural element 12 and the situational change processor 13 and performs fuzzy inference in accordance with the inference rules so as to determine an inference operational quantity, and an evaluator 15 for evaluating, on the basis of an evaluation reference, the inference operational quantity outputted by the inference operational quantity determiner 14.

The situational change processor 13 is constituted by an initialization determiner 13$a$ for initializing the inference quantity of the consequent by using an output value of the inference rule division determiner 11 and a parameter searcher 13$b$ which begins a search from an output of the initialization determiner 13$a$ so as to search for an optimum parameter of the consequent by changing parameters of the consequent in accordance with an output of the evaluator 15.

Hereinbelow, operational steps of the device K1 are described.

[Step 1]

At this step, input variables $x_{ij}$ (j=1, 2, —, k) associated with observations $y_i$ (i=1, 2, —, n) are determined. The following processings are performed at the inference rule division determiner 11. The interference rule division determiner 11 has four functions, i.e., a function (1) that the number of input variables is determined by using a variable reduction method, a function (2) that an evaluation value of a system at the time of reduction of the variables is calculated when the variable reduction method is employed, a clustering function (3) that data is divided by using a clustering technique and a function (4) that clusters generated by the clustering technique are evaluated. Hereinbelow, these functions are described in operational sequence. Initially, only necessary input variables are determined by using a variable reduction method. Character m denotes the number of the input variables. Meanwhile, all the data are divided into r portions in an optimum manner by using a clustering technique. Character $R^s$ (s=1, 2, —, r) denotes each of r divisions of the learning data and character $(x_i^s, y_i^s)$ (i=1, 2, —, $n^s$) denotes contents of the learning data $R^s$ where $n^s$ is the number of data in each learning data $R^s$.

[Step 2]

At this step, a membership value of the antecedent is identified at the antecedent neural element 12. To this end, $(x_i^s, y_i^s)$ is allocated to an input value of an input layer, while $W_i^s$ is allocated to an output value of an output layer. The output value $W_i^s$ assumes 1 and 0 when the input value $(x_i, y_i)$ belongs to the learning data $R^s$ and does not belong to the learning data $R^s$, respectively for i=1, 2, —, n and s=1, 2, —, r.

A neural network for estimating the output value $W_i^s$ s by learning is identified At this time, an estimated value of the degree $W_i^s$ is defined as a membership value of the antecedent.

[Step 3]

At this step, an initial value for searching for a real number of the consequent is imparted by using the initialization determiner 13a of the situational change processor 13. For example, a mean value of output data obtained for each inference rule by the inference rule division determiner 11 is employed as the initial value. Namely, assuming that character sz denotes the initial value of the real number of the consequent for each inference rule s, the following equation is obtained.

$$sz^s = (\Sigma y_i^s)/n_s \text{ for } i=1, 2, \text{—}, n_s$$

[Step 4]

An optimum real number of the consequent is searched for by the parameter searcher 13b by changing real numbers of the consequent in accordance with a certain search rule. For example, a pattern search method or a method of rotating directions is employed as a search method. Here, the pattern search method is described briefly. In the pattern search method, procedures of probing into the state of an objective function adjacent to a current search point through search shift so as to aim at a direction of the bottom and shifting a pattern in the direction are repeated.

(1) Search shift:

If $f(x_{ik}+a_{ik}d_i) < f(x_{ik})$ for i=1, 2, —, n, then: $x_{i+1k}=x_{ik}+a_{ik}d_i$ by regarding a search shift as a success. Otherwise, the same procedure is performed by setting $a_{ik}=-a_{ik}$. If both of the methods are unsuccessful, $x_{i+1k}=x_{ik}$ is set. In the above description, character f denotes an evaluation function. Here, a problem for minimal realization is handled. Meanwhile, character $x_{ik}$ denotes a search point of a k-th search in which the i-th parameter is considered currently. Furthermore, character $a_{ik}$ denotes a weight greater than 0, i.e. $a_{ik}>0$ and character $d_i$ denotes a unit vector in which the i-th unit vector is 1.

(2) Pattern search:

A reference point $XB^k$ is shifted over a distance between the reference point $XB^k$ and a reference point $XB^{k-1}$ in a direction for connecting the reference points $XB^k$ and $XB^{k-1}$ Thus:

$$X^k = XB^k + (XB^k - XB^{k-1})$$

Figure 10:
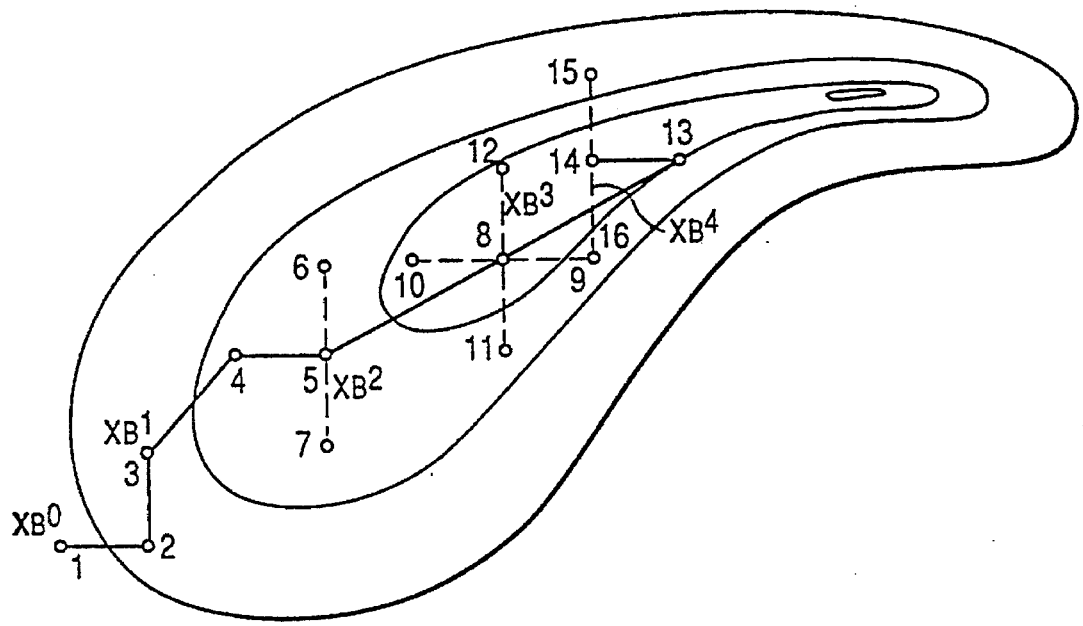
FIG. 10 is a conceptual view of a pattern search method.

The reference point $XB^k$ denotes a search point at the time of completion of the k-th search and character $X^k$ denotes a new search point. FIG. 10 is a conceptual view of a pattern search.

In this algorithm, the evaluation function f is constituted for the evaluator 15. Meanwhile, the inference operational quantity obtained by the inference operational quantity determiner 14 is substituted for the evaluation function f so as to obtain an evaluated value. The inference operational quantity is an estimated value obtained as a result of fuzzy inference. The parameter $X^k$ searched for by the parameter searcher 13b is a real number value of the consequent.

By the above described arrangement of the device K1, the real number value of the consequent is initially set. Then, by using the real number value, the estimated value of fuzzy inference is obtained. Subsequently, the estimated value is substituted for the evaluation function and thus, an overall evaluation is performed. The real number value of the consequent, which is formed by the parameter, is learned such that the evaluated value is improved. Finally, the inference rules are changed adaptively, so that the fuzzy inference has a learning function.

Furthermore, since learning is performed at the consequent by using a nonlinear search method, the inference rules can follow changing inference situations at a speed which is higher than that of a learning method employing a neural network, etc., so that its memory capacity can be reduced.

Figure 2:
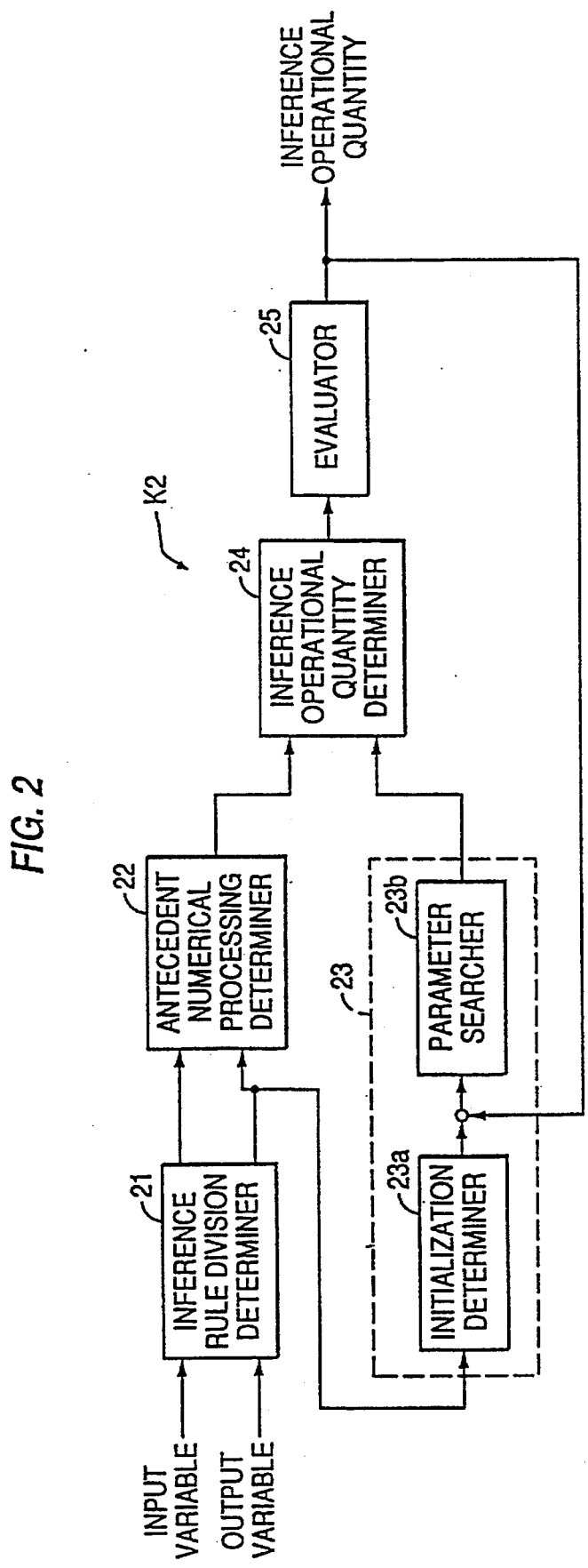
FIG. 2 is a block diagram of a fuzzy inference device according to a second embodiment of the present invention.

FIG. 2 shows a fuzzy inference device K2 according to a second embodiment of the present invention. The device K2 includes an inference rule division determiner 21 which receives data of input variables and output variables so as to determine the number of inference rules, and an antecedent numerical processing determiner 22 for obtaining a membership value corresponding to an antecedent of a specific inference rule from the divided data of the input and output variables by calculating a spatial distance. The device K2 further includes a situational change processor 23 for adaptively determining an inference quantity of a consequent of each inference rule in the case of a change of an initial state or inference situations, an inference operational quantity determiner 24 which receives outputs from the antecedent numerical processing determiner 22 and the situational change processor 23 and performs fuzzy inference in accordance with the inference rules so as to determine an inference operational quantity and an evaluator 25 for evaluating, on the basis of an evaluation reference, the inference operational quantity outputted from the inference operational quantity determiner 24.

In the same manner as the situational change processor 13 of the device K1, the situational change processor 23 of the device K2 is constituted by an initialization determiner 23a for initializing the inference quantity of the consequent by using an output value of the inference rule division determiner 21 and a parameter searcher 23b which begins a search from an output of the initialization determiner 23a so as to search for an optimum parameter of the consequent by changing parameters of the consequent in accordance with an output of evaluator 25.

Hereinbelow, operational steps of the device K2 are described. Since steps 1, 3 and 4 of the device K2 are the same as those of the device K1, a description thereof is omitted for the sake of brevity and thus, only step 2 is described.

[Step 2]

At this step, a membership value of the antecedent is determined at the antecedent numerical processing determiner 22. A distance from the input/output data $(x_i^s, y_i^s)$ of each inference rule to a core obtained for each inference rule by clustering is obtained and a value of the distance is normalized. Assuming that character $W_i^s$ denotes a normalized degree, the degree $W_i^s$ is defined as the membership value of the antecedent.

By the above described arrangement of the device K2, the inference rules are changed adaptively and thus, the fuzzy inference has a learning function.

Meanwhile, in the device K2, since the antecedent is determined by using statistical processing and the consequent is learned by using a nonlinear search method, the inference rules can follow changing inference situations at a speed which is higher than that of a learning method employing a neural network, etc., so that its memory capacity can be reduced.

Figure 3:
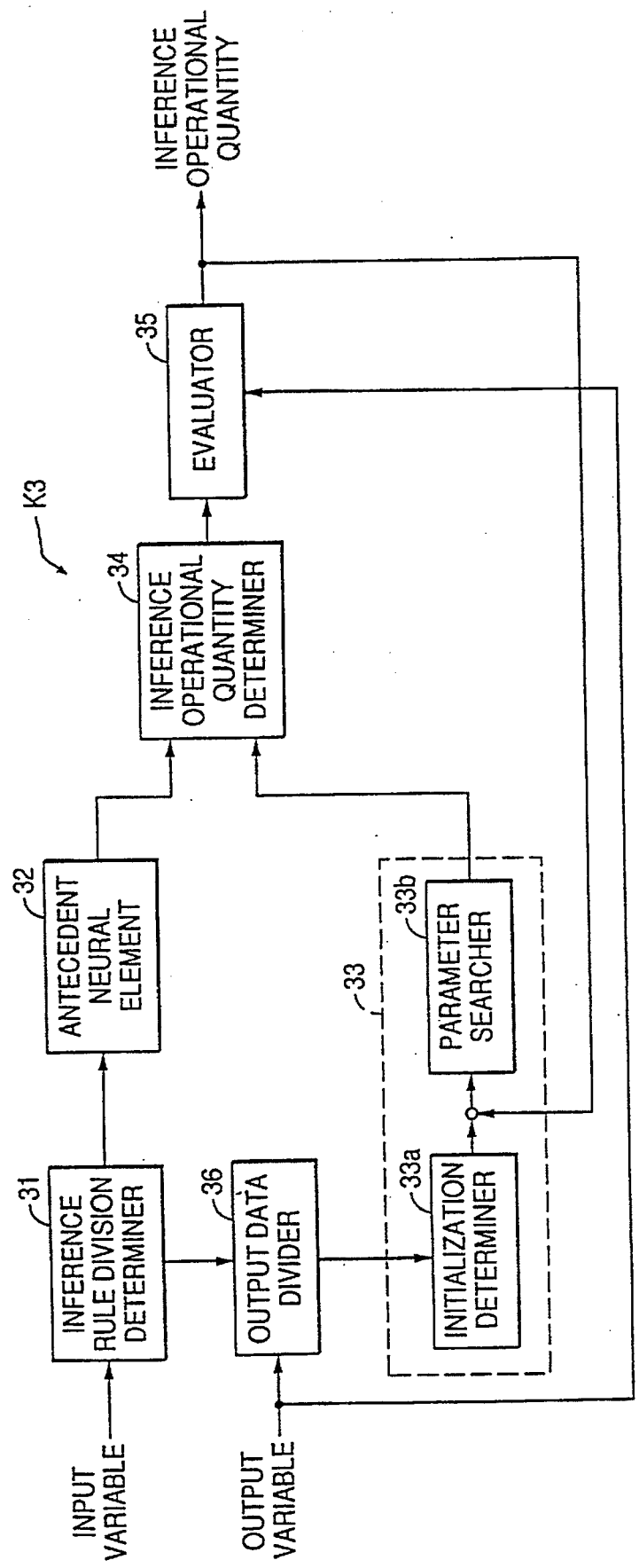
FIG. 3 is a block diagram of a fuzzy inference device according to a third embodiment of the present invention.

FIG. 3 shows a fuzzy inference device K3 according to a third embodiment of the present invention. The device K3 includes an inference rule division determiner 31 which receives data of input variables so as to determine the number of inference rules, an antecedent neural element 32 for obtaining a membership value corresponding to an antecedent of a specific inference rule from the divided data of the input variables by using a neural network, and an output data divider 36 which receives data of output variables so as to divide the data of the output variables by the number of the inference rules in accordance with an output of the inference rule division determiner 31. The device K3 further includes a situational change processor 33 for adaptively determining an inference quantity of a consequent of each inference rule in the case of a change of an initial state or inference situations, an inference operational quantity determiner 34 which receives outputs from the antecedent neural element 32 and the situational change processor 33 and performs fuzzy inference in accordance with the inference rules so as to determine an inference operational quantity, and an evaluator 35 which compares the data of the output variables with the inference operational quantity outputted by the inference operational quantity determiner 34 so as to evaluate the inference operational quantity.

The situational change processor 33 is constituted by an initialization determiner 33a for initializing the inference quantity of the consequent by using an output value of the output data divider 36, and a parameter searcher 33b which begins a search from an output of the initialization determiner 33a so as to search for an optimum parameter of the consequent by changing parameters of the consequent in accordance with an output of the evaluator 35.

Hereinbelow, operational steps of the device K3 are described.

[Step 1]

At this step, input variables $x_{ij}$ (j=1, 2, —, k) associated with observations $y_i$ (i=1, 2, —, n) are determined. The following processings are performed at the inference rule division determiner 31. Initially, only necessary input variables are determined by using a variable reduction method. Character m denotes the number of the input variables. Meanwhile, only the input data is divided into r portions in an optimum manner by using clustering technique. Character $R^s$ (s=1, 2, —, r) denotes each of r divisions of the data and character $x_i$ (i=1, 2, —, n) denotes contents of the data $R^s$ where $n^s$ is the number of data in each data $R^s$. A group of the input data divided for each inference rule is fed to the output data divider 36.

[Step 2]

At this step, the output data is divided into r portions on the basis of an input. data number by the output data divider 36. Character $y_i^s$ (i=1, 2, —, $n^s$) denotes the contents of each of r the divisions of the output data.

[Step 3]

At this step, a membership value of the antecedent is identified at the antecedent neural element 32. To this end, $x_i$ is allocated to an input value of an input layer, while $W_i^s$ is allocated to an output value of an output layer. The output value $W_i^s$ assumes 1 and 0 when the input value $x_i$ belongs to the data $R^s$ and does not belong to the data $R^s$ respectively for i=1, 2, —, n and and s=1, 2, —, r.

A neural network for estimating the output value $W_i^s$ by learning is identified. At this time, an estimated value of the degree $W_i^s$ is defined as a membership value of the antecedent.

[Step 4]

At this step, an initial value for searching a real number of the consequent is imparted by using the initialization determiner 33a of the situational change processor 33. For example, a mean value of output data obtained for each inference rule by the inference rule division determiner 31 is employed as the initial value. Namely, assuming that character sz denotes the initial value of the real number of the consequent for each inference rule s, the following equation is obtained.

$$sz^s = (\Sigma y_i^s)/n_s \text{ for } i=1, 2, —, n_s$$

[Step 5]

An optimum real number of the consequent is searched for by the parameter searcher 33b by changing real numbers z of the consequent in accordance with a certain search rule. For example, a steepest descent method is employed as a search method.

Here, the steepest descent method is described briefly. In this method, a directional vector $d^k$ at a point $X^k$ is expressed as follows.

$$d^k = -\nabla^t f(X^k)$$

In the above equation, $\nabla^t f(X^k)$ means a gradient vector of an evaluation function f at X. This equation is used because a reduction rate of the evaluation function f is maximized in a direction of the directional vector $d^k$. In this algorithm, the following equation is used as the evaluation function f:

$$E = \Sigma(y_i - ey_i)^2/2$$

where character $ey_i$ denotes an estimated value of fuzzy inference.

A quantity $\Delta z^s$ of change, which determines a direction for learning the real numbers z of the consequent up to an optimum value, is obtained. Initially, a partial differential of E is performed by z as follows:

$$dE/dz^s = (dE/dey_i) \times (dey_i/dz^s)$$

where $$dE/dey_i = -(y_i - ey_i)$$

and $$dey/dz^s = W^s/\Sigma W^s.$$

Thus, the following equation is obtained.

$$dE/dz^s = -(y_i - ey_i)W^s/\Sigma W^s$$

If the real numbers z of the consequent are changed in the direction determined by the following quantity $\Delta z^s$ of change in accordance with the steepest descent method, the real numbers z are adaptively learned so as to be converged to the optimum value.

$$\Delta z^s = -\alpha(dE/dz^s) = \alpha(y_i - ey_i)W^s/\Sigma W^s$$

Figure 11A:
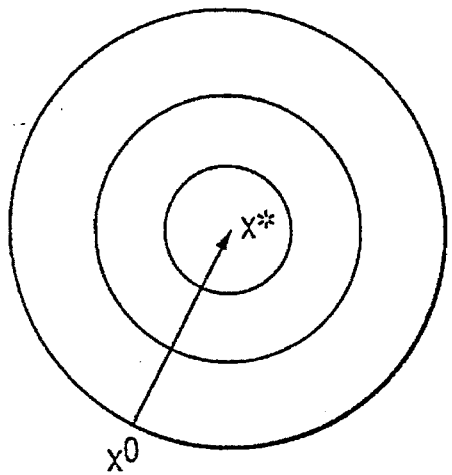
FIGS. 11($a$) and 11($b$) are a conceptual view of a steepest descent method.
Figure 11B:
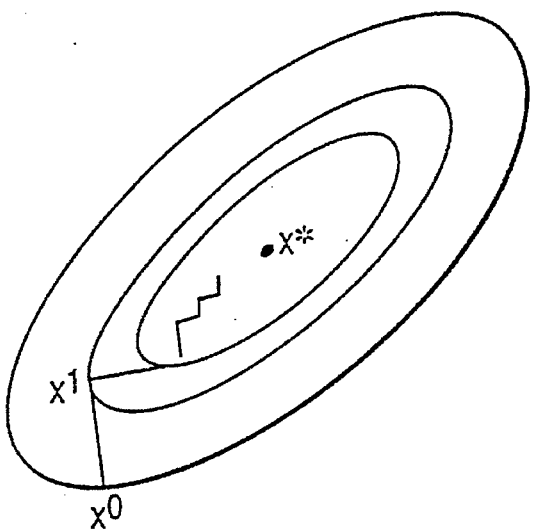
Figure 12:
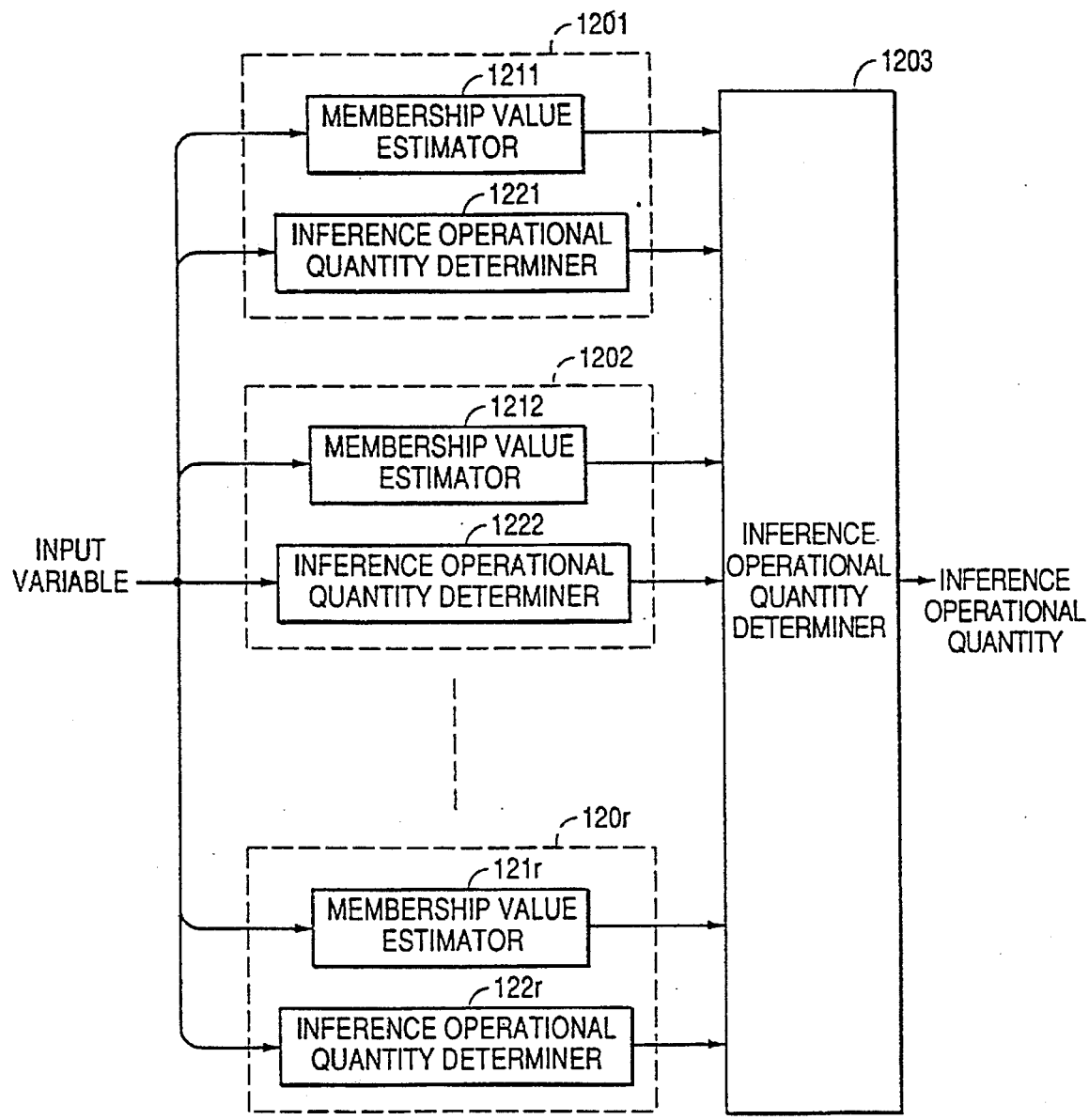
FIG. 12 is a block diagram showing one example of the prior art fuzzy inference device of FIG. 6.

FIGS. 11(a) and 11(b) are a conceptual view of the steepest descent method. In this algorithm, the evaluation function f is substituted for the evaluator 35. Meanwhile, the inference operational quantity obtained at the inference operational quantity determiner 34 and a correct output value are substituted for the evaluation function f, whereby an evaluation value is obtained. The inference operational quantity is an estimated value obtained as a result of fuzzy inference and the parameter $X^k$ to be searched for by the parameter searcher 33b acts as the real number of the consequent.

By the above described arrangement of the device K3, the real number value of the consequent is initially set. Then, by using the real number value, the estimated value of fuzzy inference is obtained. Subsequently, the estimated value is substituted for the evaluation function and thus, an overall evaluation is performed. The real number value of the consequent, which is formed by the parameter, is learned such that the evaluated value is improved. Finally, the inference rules are changed adaptively and thus, the fuzzy inference has a learning function.

Meanwhile, since learning. is performed at the consequent by using a nonlinear search method, the inference rules can follow changing inference situations at a speed which is higher than that of a learning method employing a neural network, etc., so that its memory capacity can be reduced.

Figure 4:
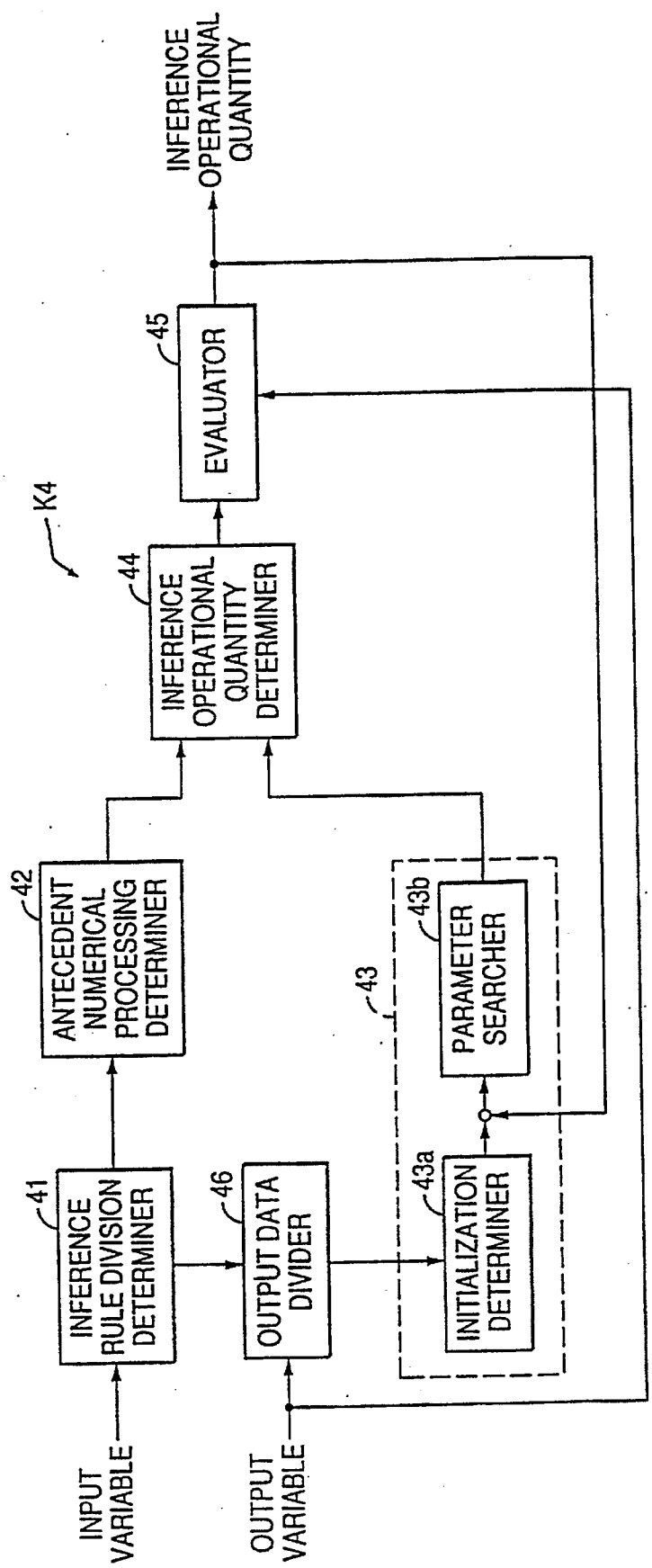
FIG. 4 is a block diagram of a fuzzy inference device according to a fourth embodiment of the present invention.
Figure 5:
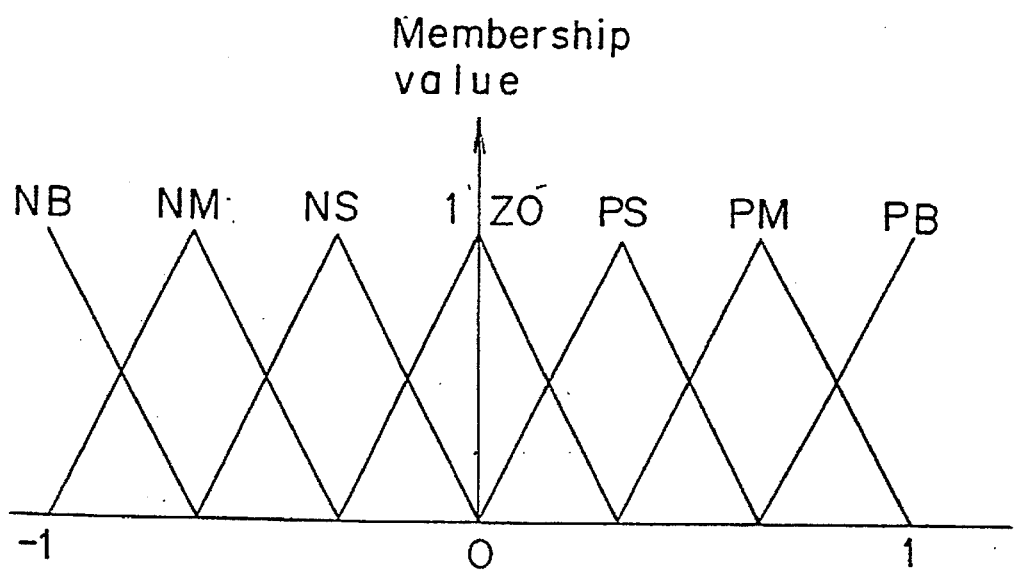
FIG. 5 is a explanatory view of fuzzy variables.
Figure 9:
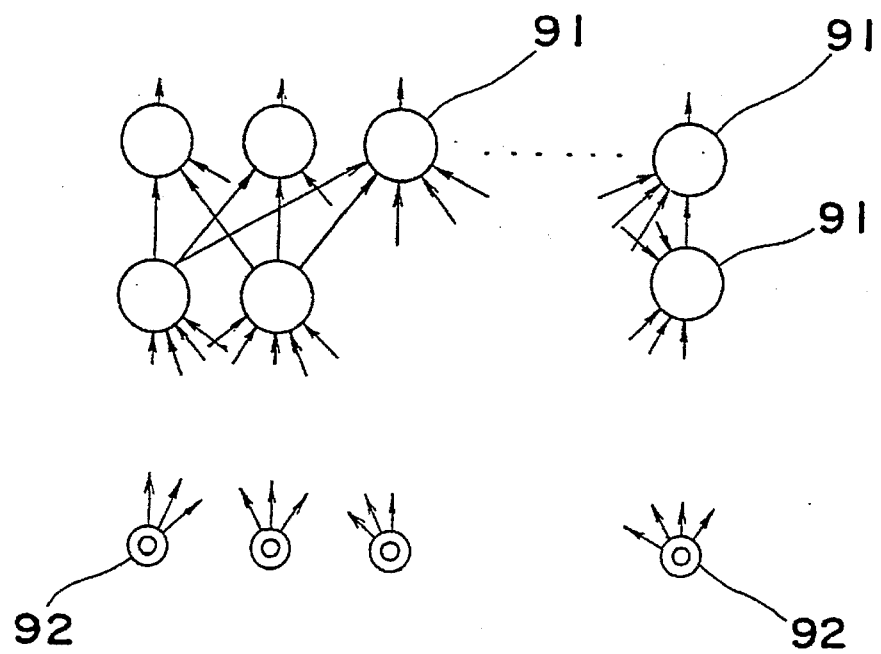
FIG. 9 is a schematic view showing the configuration of a neural network.

FIG. 4 shows a fuzzy inference device K4 according to a fourth embodiment of the present invention. The device K4 includes an inference rule division determiner 41 which receives data of input variables so as to determine the number of inference rules, an antecedent numerical processing determiner 42 for obtaining a membership value corresponding to an antecedent of a specific inference rule from the divided data of the input variables by calculating a spatial distance and an output data divider 46 which receives data of output variables so as to divide the data of the output variables by the number of the inference rules in accordance with an output of the inference rule division determiner 41. The device K4 further includes a situational change processor 43 for adaptively determining an inference quantity of a consequent of each inference rule in the case of a change of an initial state or inference situations, an inference operational quantity determiner 44 which receives outputs from the antecedent numerical processing determiner 42 and the situational change processor 43 and performs fuzzy inference in accordance witch the inference rules so as to determine an inference operational quantity, and an evaluator 45 which compares the data of the output variables with the inference operational quantity outputted by the inference operational quantity determiner 44 so as to evaluate the inference operational quantity.

In the same manner as the situational change processor 33 of the device K3, the situational change processor 43 of the device K4 is constituted by an initialization determiner 43a for initializing the inference quantity of the consequent. by using an output value of the output data divider 46, and a parameter searcher 43b which begins a search from an output of the initialization determiner 43a so as to search for an optimum parameter of the consequent by changing parameters of the consequent in accordance with an output of the evaluator 45.

Hereinbelow, operational steps of the device K4 are described. Since steps 1, 2, 4 and 5 of the device K4 are the same as those of the dewice K3, a description thereof is omitted for the sake of brevity and thus, only step 3 is described.

[Step 3]

At this step, a membership value of the antecedent is determined at the antecedent numerical processing determiner 42. A distance from the input/output data $(x_i^s, y_i^s)$ of each inference rule to a core obtained for each inference rule by clustering is obtained and a value of the distance is normalized. Assuming that character $W_i^s$ denotes a normalized degree, the degree $W_i^s$ is defined as the membership value of the antecedent.

By the above described arrangement of the device K4, the inference rules are adaptively changed and thus, the fuzzy inference has a learning function.

Meanwhile, in the device K4, since the antecedent is determined by using statistical processing and the consequent is learned by using a nonlinear search method, the inference rules can follow changing inference situations at a speed which is higher than that of a learning method employing a neural network, etc., so that its memory capacity can be reduced.

In the present invention as described above, the structure of the antecedent of each inference rule is identified by using nonlinear characteristics of the neural network and an optimum parameter of the consequent of each inference rule is determined such that the inference operational quantity can be adapted to changing inference situations at a high speed and with reduced memory capacity. Therefore, in accordance with the present invention, the fuzzy inference device can provide: inference satisfactory to the operator at all times.

Meanwhile, in the first and second embodiments of the present invention, the optimum parameter of the consequent is searched for by using a pattern search method and a method of rotating directions in which methods a search can be made even if an optimum value of the parameters is not required to be outputted. However, these methods may be replaced by a random search method, feasible direction method or cutting plane method.

Furthermore, in the third and fourth embodiments of the present invention, the optimum parameter of the consequent is searched for by using a steepest descent method in which a search can be made by formulating an evaluation function by using errors. Howewer, this steepest descent method may be replaced by Newton's method, etc.

As is clear from the foregoing description, in the present invention, the fuzzy inference rules can be changed automatically through a self-learning function even if inference situations change. Furthermore, the optimum parameter of the consequent is searched for by a nonlinear search method.

Consequently, in accordance with the present invention, the inference operational quantity can be adapted to changing inference situations at a high speed and with reduced memory capacity.

A more detailed description of the first through fourth embodiments of the present invention is set forth below with reference to FIGS. 13–16.

Figure 13:
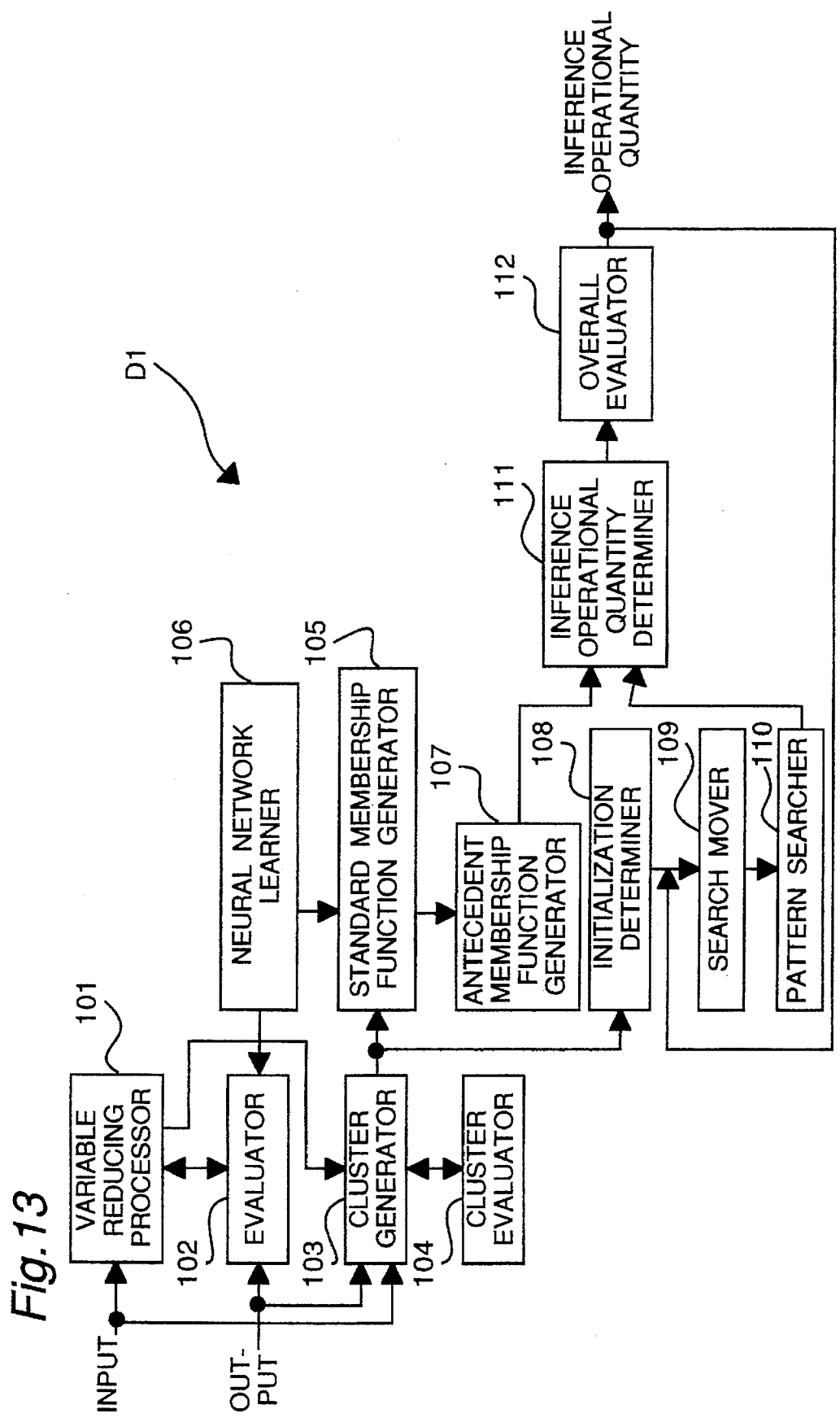
FIG. 13 is a more detailed diagram of a fuzzy inference device according to the first embodiment of the present invention.

FIG. 13 shows a fuzzy inference device D1 for determining an inference operational quantity in accordance with inference rules each constituted by an antecedent and a consequent, according to a first embodiment of the present invention. The fuzzy inference device D1 includes a variable reducing processor 101 which receives data of input variables and reduces the number of the input variables so as to determine the number of the input variables, an evaluator 102 for evaluating determination of the number of the input variables performed by the variable reducing processor 101, a cluster generator 103 which receives data of the input variables determined by the variable reducing processor 101 and output variables and divides the data into a plurality of data groups so as to determine the number of fuzzy inference rules by determining representative data of each of the data groups and a cluster evaluator 104 for performing evaluation for determining the number of the fuzzy inference rules in the cluster generator 103.

The fuzzy inference device D1 further includes a standard membership function generator 105 for generating learning data for determining a membership function of an antecedent of fuzzy inference by using input data belonging to each of the fuzzy inference rules determined by the cluster generator 103, a neural network learner 106 for performing learning through a neural network, an antecedent membership function generator 107 for determining shape of the membership function by using the learning data generated by the standard membership function generator 105 and learning function of the neural network learner 106, an initialization determiner 108 for determining an initial value of a search parameter so as to determine a real number of a consequent of fuzzy inference by using input and output data belonging to each of the fuzzy inference rules determined by the cluster generator 103, a search mover 109 for moving the search parameter along each of search axes from the initial value in the initialization determiner 108 and a pattern searcher 110 for increasing a motion distance of the search parameter in the search mover 109.

Moreover, the fuzzy inference device D1 includes an inference operational quantity determiner 111 which performs fuzzy inference by using the membership function in the antecedent membership function generator 107 and the search parameter in the pattern searcher 110 so as to determine the inference operational quantity and an overall evaluator 112 for evaluating, in accordance with an evaluation criterion, the inference operational quantity outputted by the inference operational quantity determiner 111.

Hereinbelow, operational steps of the fuzzy inference device D1 are described.

(Step 1)

Input variables associated with observations $Y_i$ (i=1, 2, —, n) are expressed by $x_j$ (j=1, 2, —, k). The following operations are performed in the variable reducing processor 101 so as to reduce the number of the input variables to m (m<k). Initially, correlative coefficient in k input variables $x_j$ (j=1, 2, —, k) is obtained. Supposing that $r_{xkj}$ represents correlative coefficient between input variables $x_k$ and $x_j$, the following matrix R having the correlative coefficient $r_{xkj}$ as its components is obtained.

$$R = \begin{bmatrix} r_{x11}, & r_{x12}, & ---, & r_{x1k} \\ r_{x21}, & r_{x22}, & ---, & r_{x2k} \\ \cdot & & & \\ \cdot & & & \\ \cdot & & & \\ r_{xk1}, & r_{xk2}, & ---, & r_{xkk} \end{bmatrix}$$

An inverse matrix IR of the matrix R is obtained as follows.

$$IR = \begin{bmatrix} r^{x11}, & r^{x12}, & ---, & r^{x1k} \\ r^{x21}, & r^{x22}, & ---, & r^{x2k} \\ \cdot & & & \\ \cdot & & & \\ \cdot & & & \\ r^{xk1}, & r^{xk2}, & ---, & r^{xkk} \end{bmatrix}$$

In the above inverse matrix IR, $r^{xkj}$ represents a component of k-th row and j-th column of the inverse matrix IR. Then, a partial correlative coefficient $p_{kj}$ is obtained by the following equation.

$$p_{kj} = -r^{xkj}/\sqrt{r^{xkk} \times r^{xjj}}$$

Values of the partial correlative coefficient $p_{kj}$ are ranked in increasing order. The number of sorts of the input variables is set to m in accordance with this ranking and the remaining input variables are eliminated. The obtained m is a result determined by the variable reducing processor 101.

Then, in the cluster generator 103, all data is divided into a plurality of groups (clusters) by employing a known clustering procedure. In this embodiment, centroid method is employed for clustering. In centroid method, a cluster is formed by each data and a plurality of clusters are united with each other sequentially from those disposed adjacent to each other such that one cluster is formed at last. However, a distance between the clusters is defined as a distance between central positions of the clusters. In each step of uniting the clusters, the cluster generator 103 causes the cluster generator 104. to an evaluation value EV (=$\Sigma V(R^s)/r+CV$) by obtaining a variance $V(R^s)$ of data included in each cluster $R^s$ and a variance CV of central points of the clusters on the supposition that r denotes the number of the clusters. This value EV is an evaluation function indicative of property of clustering. When the value EV reaches a minimum, it is considered that an optimum cluster is obtained. The cluster generator 103 searches for clusters for minimizing the evaluation value calculated by the cluster evaluator 104 so as to determine the clusters and the number of the clusters.

It is to be noted that r denotes the number of clusters in clustering having an optimum evaluation value, $R^s$ (s=1, 2, —, r) denotes each cluster at this time, $(x_i^s, y_i^s)$ (i=1, 2, —, $M^s$) denotes data included in $R^s$ and $M^s$ denotes the number of data in $R^s$. Meanwhile, in this embodiment, centroid method is employed for clustering but may also be replaced by other clustering procedures such as shortest distance method and longest distance method. In addition, the evaluation function EV calculated by the cluster evaluator 104 may also be replaced by other known evaluation functions such as AIC, MDL, etc.

(Step 2)

In the standard membership function generator 105, data is selected, by sampling, from the data divided into the r clusters by the cluster generator 103 and learning data required for generating a membership function is generated. A random function is employed for sampling. The learning data of each cluster $R^s$ is expressed by $(x_i^s, y_i^s)$ (i=1, 2, —, $n^s$) in which $n^s$ denotes the number of data in $R^s$. The antecedent membership function generator 107 identifies a membership value of an antecedent as follows. Initially, $(x_i^s, y_i^s)$ is allotted to input value $(x_i, y_i)$ of an input layer of a neural network included in the antecedent membership function generator 107 and $W_i^s$ is allotted to output value of an output layer.

$$W_i^s = \begin{cases} 1: (x_i, y_i) \text{ belongs to } R^s \\ 0: (x_i, y_i) \text{ does not belong to } R^s \end{cases}$$

$$\{\text{for } i = 1, \cdots, n, s = 1, \cdots, r\}$$

Subsequently, by utilizing neural learning in the neural network learner 106 minimizing square error which is square of difference between $W_i^s$ and output value of a neural network, a neural network for estimating $W_i^s$ is identified. Back-propagation method described in "Parallel Distributed Processing, Vol. 1" The MIT Press (1986) by Rumelhart, D. E. is employed in this neural learning. An estimated value of degree $W_i^s$ obtained by neural learning is defined as a membership value of an antecedent.

(Step 3)

By setting to (m-1) the number m of the input variables determined by the variable reducing processor 101, steps 1 and 2 are repeated. In the evaluator 102, the square errors calculated by the neural network learner 106 for the numbers m and (m-1) of the input variables are compared with each other and one of the numbers m and (m-1), which leads to a less one of the square errors, is employed. Until this error value is improved, steps 2 and 3 are repeated. As a result, an optimum number of the input variables can be determined.

(Step 4)

In the initialization determiner 108, an initial value for search of a real number of a consequent is determined. For example, a mean value of output data $y_i^s$ for each cluster (rule) $R^s$ obtained by the cluster generator 103 is used as the initial value. Namely, an initial value $sz^s$ of the real number $z^s$ of the consequent of each rule s is given by the following equation.

$$sz^s = (\Sigma y_i^s)/n^s \ \{i=1, 2, —, n^s\}$$

(Step 5)

In the search mover 109 and the pattern searcher 110, the real number of the consequent is changed in accordance with a search rule so as to be searched for. For example, pattern search method and method of rotating directions may be employed for this search. In this example, pattern search method is described briefly. In pattern search method, procedures are repeated in which state of an objective function adjacent to a current search point is investigated through search motion by the search mover 109 so as to roughly determine direction considered to improve value of the objective function and a pattern is moved in the direction by the pattern searcher 110.

(1) Search motion by the search mover 109

If $f(x_{ik}+a_{ik}d_i) < f(x_{ik})$ {i=1, 2, —, n}, then: $x_{i+ik} = x_{ik}+a_{ik}d_i$ by regarding search motion as a success. Otherwise, the same procedure is performed by setting $a_{ik} = -a_{ik}$. If both of the above procedures are unsuccessful, $x_{i+ik} = x_{ik}$ is set. Here f denotes an evaluation function to be set arbitrarily and a problem of minimal realization is handled. Meanwhile, $x_{ik}$ denotes a search point of k-th search in which the i-th parameter is considered currently. Furthermore, $a_{ik}$ denotes weight greater than 0 and $d_i$ denotes a unit vector in which the i-th unit vector is 1.

(2) Pattern search by the pattern searcher 110

From a reference point, $X_B^k$, a distance between $X_B^k$ and $X_B^{k-1}$ is moved in a direction linking $X_B^k$ and $X_B^{k-1}$. Thus:

$$X^k X_B^k + (X_B^k - X_B^{k-1})$$

The reference point $X_B^k$ represents a search point at the time of completion of k-th search and $X^k$ represents a new search point. FIG. 10 shows, concept of pattern search.

In this algorithm, the evaluation function f is calculated by the overall evaluator 112 of FIG. 13. The evaluation function f can be set. arbitrarily so as to match a system as an object. Inference operational quantity obtained by the inference operation quantity determiner 111 is inputted to the overall evaluator 112 and thus, the overall evaluator 112 outputs an evaluation value. Inference operational quantity is an estimated value obtained as a result of fuzzy inference, while the parameter $X^k$ to be searched for is the real number of the consequent.

By the above described, arrangement of the fuzzy inference device D1, the real number of the consequent is initially set and an estimated value for fuzzy inference is obtained by using the real number. Then, by substituting the estimated value for the evaluation function, overall evaluation is achieved. The real number of the consequent, which acts as a parameter, is adjusted by the search mover 109 and the pattern searcher 110 such that the evaluation value is improved. Finally, the inference rules are changed adaptively and fuzzy inference possesses learning function. Meanwhile, since the consequent is learned by using nonlinear search method, follow-up speed is raised and memory capacity is reduced as compared with those of learning method employing a neural network, etc.

Figure 14:
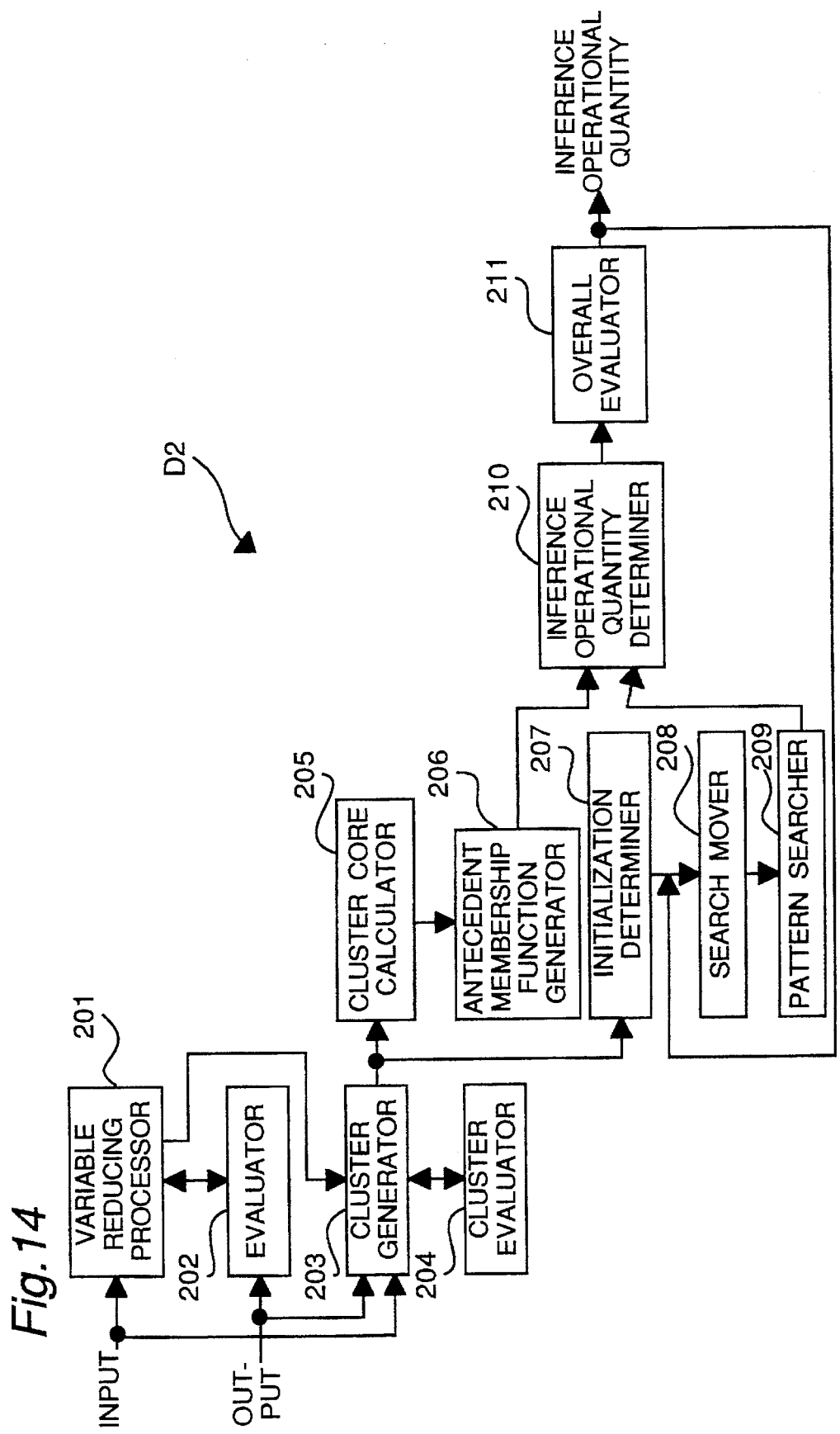
FIG. 14 is a more detailed diagram of a fuzzy inference device according to the second embodiment of the present invention.

FIG. 14 shows a fuzzy inference device D2 according to a second embodiment of the present invention. The fuzzy inference device includes a variable reducing processor 201, an evaluator 202, a cluster generator 203, a cluster evaluator 204, a cluster core calculator 205, an antecedent membership function generator 206, an initialization determiner 207, a search mover 208, a pattern searcher 209, an inference operational quantity determiner 210 and an overall evaluator 211. Since functions of the elements 201 to 204 and 207 to 211 of the fuzzy inference device K2 are the same as those of the elements 101 to 104 and 108 to 112 of the fuzzy inference device K1, respectively, their description is abbreviated for the sake of brevity. Thus, only functions of the elements 205 and 206 are described.

The cluster core calculator 205 calculates a distance between input data and representative data belonging to each of fuzzy inference rules determined by the cluster generator 203 so as to determine a membership function of an antecedent of fuzzy inference, while the antecedent membership function generator 206 determines shape of the membership function by using the distance calculated by the cluster core calculator 205.

Hereinbelow, operational steps of the fuzzy inference device D2 are described. Since steps 1 and 3–5 of the fuzzy inference device D2 are the same as those of the fuzzy inference device D1, their description is abbreviated for the sake of brevity. Thus, only step 2 is described.

(Step 2)

In the cluster core circulator 205, a distance $D_i^s$ from input and output data $(x_i^s, y_i^s)$ to a core (center of cluster) obtained for each inference rule by clustering is obtained and is normalized.

$$W_i^s = \{max_i(D_i^s) - D_i^s\}/max_i(D_i^s)$$

In the antecedent membership function generator 206, normalization degree $W_i^s$ is defined as a membership value of the antecedent.

By the above mentioned arrangement of the fuzzy inference device D2, the inference rules are changed adaptively and fuzzy inference possesses learning function. Meanwhile, since the antecedent is determined by using statistical processing and the consequent is learned by using non-linear search method, follow-up speed is raised and memory capacity is reduced in comparison with those of learning method employing a neural network, etc.

Figure 15:
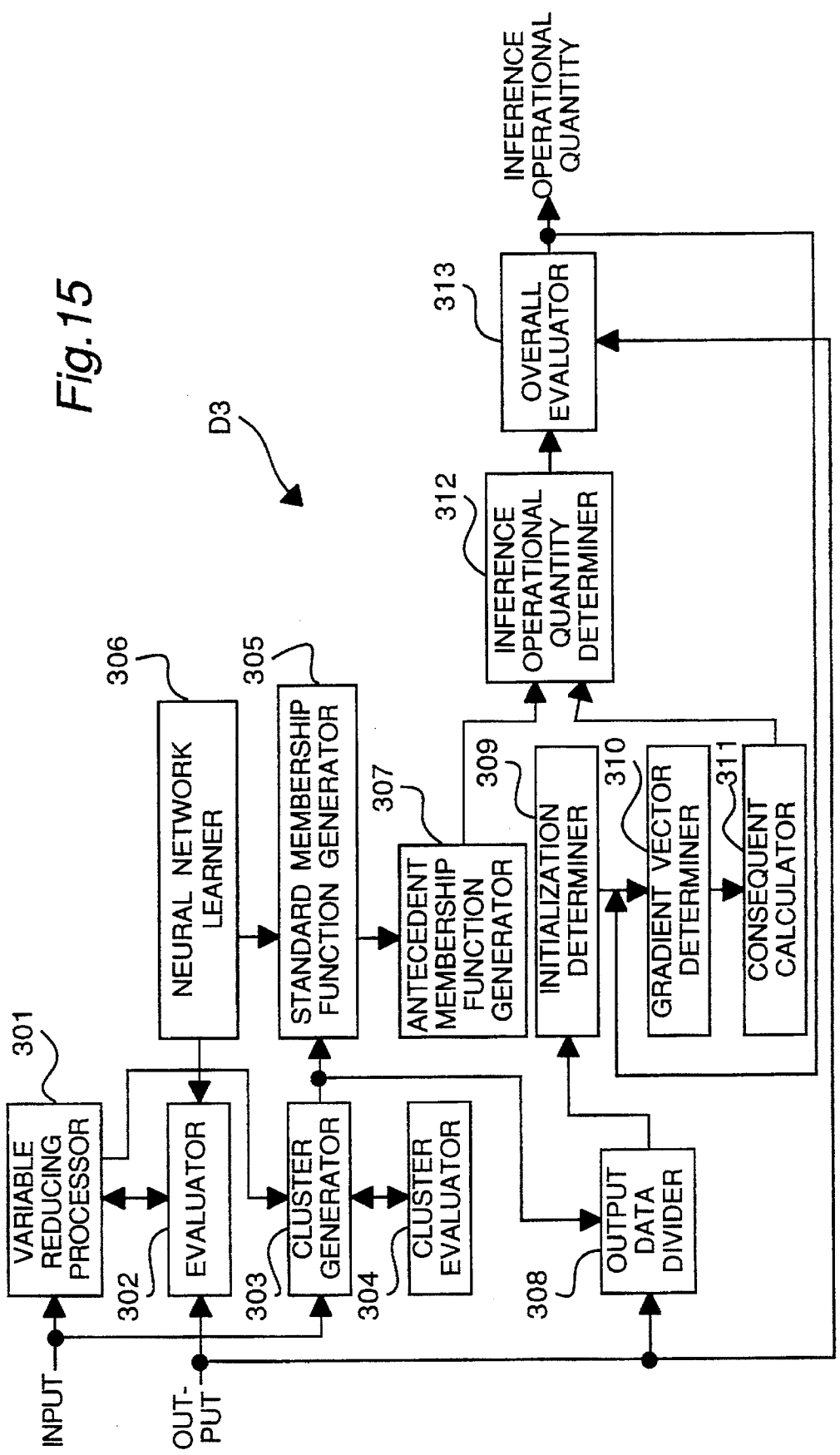
FIG. 15 is a more detailed diagram of a fuzzy inference device according to the third embodiment of the present invention.

FIG. 15 shows a fuzzy inference device D3 according to a third embodiment of the present invention. The fuzzy inference device D3 includes a variable reducing processor 301, an evaluator 302, a cluster generator 303, a cluster evaluator 304, a standard membership function generator 305, a neural network learner 306, an antecedent membership function generator 307, an output data divider 308, an initialization determiner 309, a gradient vector determiner 310, a consequent calculator 311, an inference operational quantity determiner 312 and an overall evaluator 313. Since functions of the elements 301, 302, 304 to 307 and 313 of the fuzzy inference device D3 are similar to those of the elements 101, 102, 104 to 107 and 112 of the fuzzy inference device D1, their description is abbreviated for the sake of brevity. Thus, only functions of the elements 303 and 308 to 312 are described.

The cluster generator 303 receives data of input variables determined by the variable reducing processor 301 and divides the data into a plurality of data groups so as to determine the number of fuzzy inference rules by determining representative data of each of the data groups. The output data divider 308 divides output data into output data portions such that each of the output data portions corresponds to input data belonging to each of the fuzzy inference rules determined by the cluster generator 303. The initialization determiner 309 determines an initial value of a search parameter so as to determine a real number of a consequent of fuzzy inference by using the input and output data of the output data divider 308. The gradient vector determiner 310 calculates a difference amount of inference errors relative to the search parameter, while the consequent calculator 311 calculates the real number of the consequent on the basis of the value calculated by the gradient vector determiner 310. The inference operational quantity determiner 312 performs fuzzy inference by using a membership function of the antecedent membership function generator 307 and the real number of the consequent calculator 311 so as to determine inference operational quantity.

Hereinbelow, operational steps of the fuzzy inference device D3 are described.

(Step 1)

Input variables associated with observations $y_i$ (i=1, 2, —, n) are expressed by $x_j$ (j=1, 2, —, k). Initially, the number of input variables is set to m in the variable reducing processor 301. Then, in the cluster generator 303, operation similar to that of the cluster generator 103 of the fuzzy inference device D1 are performed and thus, only input data is divided into r portions in optimum manner by clustering. $R^s\{s=1, 2, —, r\}$ denotes each of r divisions of learning data and $x_i^s$ {i=1, 2, —, $M^s$} denotes data of $R^s$ when $M^s$ is the number of data included in $R^s$. In this embodiment, shortest distance method or centroid method is employed for clustering. Calculation for evaluating this clustering is performed by the cluster evaluator 304. For each of clusters (inference rules), input data is fed to the output data divider 308.

(Step 2)

In the output data divider 308, the output data is divided into r portions from input data No. For example, in case the output data is divided into three portions, 1-st output data, 4-th output data, 7-th output data, etc. are classified into a first group, while 2-nd output data, 5-th output data, 8-th output data, etc. are classified into a second group. Likewise, 3-rd output data, 6-th output data, 9-th output data, etc. are classified into a third group. Output data of each group Is expressed by $y_i^s$ {i=1, 2, —, $M^s$}.

(Step 3)

In the standard membership function generator 305, data is extracted, by sampling, from the data of r divisions produced by the cluster generator 303 so as to formulate learning data required for generating the membership function. Learning data in $R^s$ is expressed by $(x_i^s, y_i^s)$ {i=1, 2, —, $n^s$}when $n^s$ is the number of data in $R^s$. The antecedent membership function generator 307 identifies a membership value of an antecedent as follows. Initially, $(x_i^s, y_i^s)$ is allotted to input value $(x_i, y_i)$ of an input layer of a neural network and $W_i^s$ is allotted to output value of an output layer.

$$W_i^s = \begin{cases} 1: (x_i, y_i) \text{ belongs to } R^s \\ 0: (x_i, y_i) \text{ does not belong to } R^s \end{cases}$$

$$\{\text{for } i = 1, ---, n, s = 1, ---, r\}$$

Subsequently, by utilizing neural learning in the neural network learner 306 minimizing square error which is square of difference between $W_i^s$ and output value of a neural network, a neural network for estimating $W_i^s$ is identified. An estimated value of this degree $W_i^s$ is defined as a membership value of an antecedent.

(Step 4)

By setting to (m−1) the number m of the input variables determined by the variable reducing processor 301, steps 1 to 3 are repeated. In the evaluator 302, the square errors calculated by the neural network learner 306 for the numbers m and (m−1) of the input variables are compared with each other and an optimum number of the input variables is determined.

(Step 5)

In the initialization determiner 309, an initial value for search of a real number of a consequent is determined. For example, a mean value of output data $y_i^s$ for each cluster (rule) $R^s$ obtained by the output data divider 308 is used as the initial value. Namely, an initial value $sz^s$ of the real number $z^s$ of the consequent of each rule s is given by the following equation.

$$sz^s = (\Sigma y_i^s)/n^s \quad \{i=1, 2, \ldots, n^s\}$$

(Step 6)

In the gradient vector determiner 310 and the consequent calculator 311, real number z of the consequent is changed and searched for in accordance with a search rule. Steepest descent method, for example, may be employed for search. In the gradient vector determiner 310, a directional vector $d^k$ at a point $x^k$ is calculated as follows.

$$d^k = -\nabla^t f(x^k)$$

Here, $\nabla^t f(x^k)$ means gradient vector of f at $x^k$. The above equation is used because reduction rate of f becomes greatest in the direction of $d^k$. In the overall evaluator 313, the following evaluation function E is calculated.

$$E = \Sigma(y_i - ey_i)^2/2$$

Here, $ey_i$ denotes an estimated value of fuzzy inference calculated by the inference operational quantity determiner 312. Therefore, E represents inference error (square error) of fuzzy inference. The real number of the consequent is obtained in the consequent calculator 311 as follows. Initially, partial differential of E is performed by z as follows:

$$dE/dz^s = (de/dey_i) \times (dey_i/dz^s)$$

where $$dE/dey_i = -(y_i - ey_i)$$

and $$dey_i/dz^s = W^s/\Sigma W^s.$$

Thus, the following equation is obtained.

$$dE/dz^s = -(y_i - ey_i)W^s/\Sigma W^s$$

If z is changed in the direction of the following equation by steepest descent melthod, z is adaptively learned so as to be converged to an optimum value. FIG. 11 shows concept of steepest descent method.

The evaluation function E is calculated by the overall evaluator 313 from inference operational quantity obtained by the inference operational quantity determiner 312 and accurate output value. The inference operational quantity is an estimated value obtained as a result of fuzzy inference, while the parameter $x^k$ to be searched for is the real number of the consequent.

By the above described arrangement of the fuzzy inference device D3, the real number of the consequent is initially set. Then, by using the real number, the estimated value of fuzzy inference is obtained. Subsequently, by substituting the estimated value for the evaluation function, overall evaluation is obtained. The real number of the consequent, which acts as a parameter, is learned such that the evaluation value is improved. At last, the inference rules are changed adaptively and fuzzy inference possesses learning function. Meanwhile, since the consequent is learned by using non-linear search method, follow-up speed is raised and memory capacity is reduced in comparison with those of learning method employing a neural network, etc.

Figure 16:
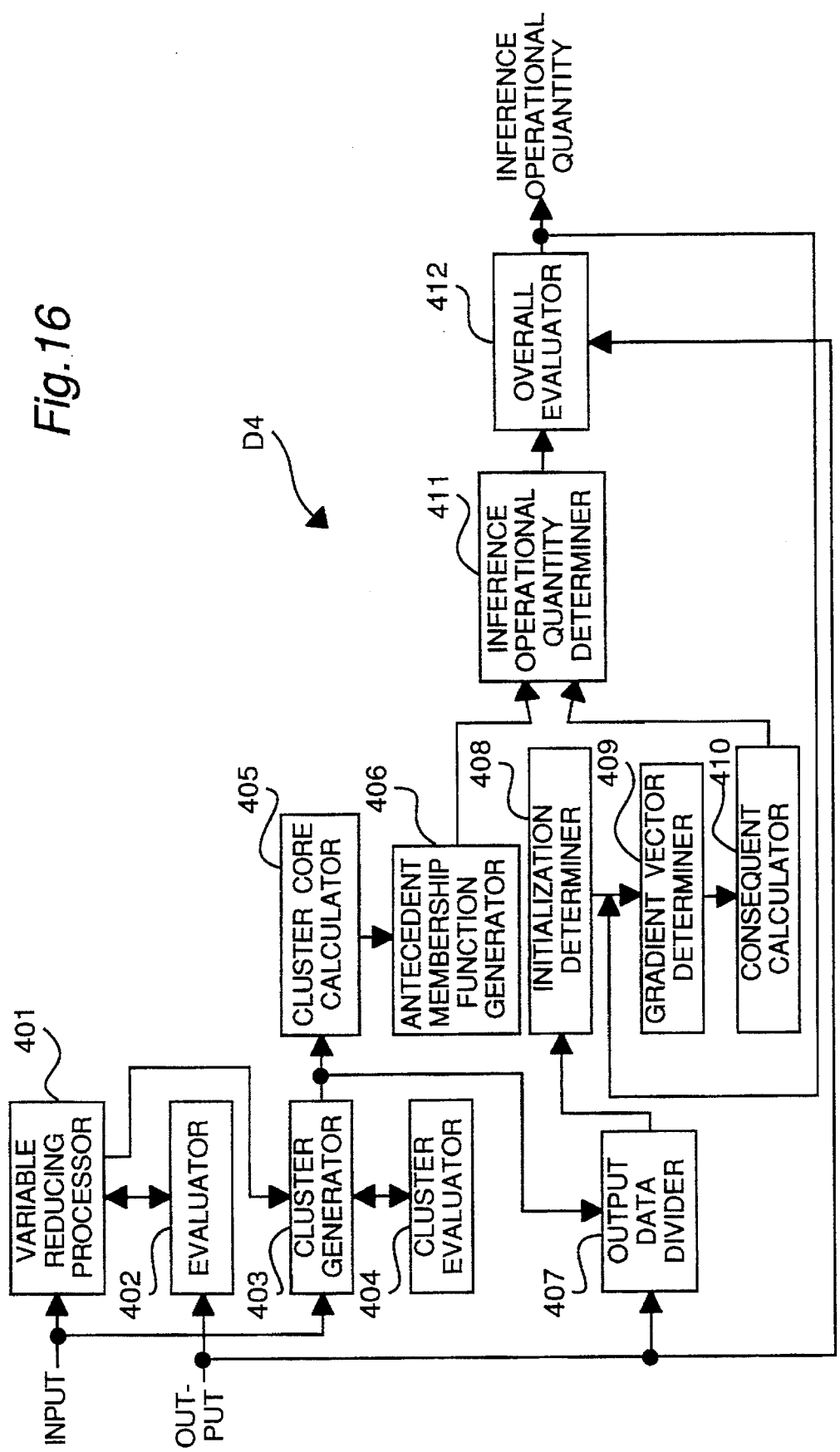
FIG. 16 is a more detailed diagram of a fuzzy inference device according to the fourth embodiment of the present invention.

FIG. 16 shows a fuzzy inference device D4 according to a fourth embodiment of the present invention. The fuzzy inference device D4 includes a variable reducing processor 401, an evaluator 402, a cluster generator 403, a cluster evaluator 404, a cluster core calculator 405, an antecedent membership function generator 406, an output data divider 407, an initialization determiner 408, a gradient vector determiner 409, a consequent calculator 410, an inference operational quantity determiner 411 and an overall evaluator 412. Since functions of the elements 405 and 406 of the fuzzy inference device D4 are the same as those of the elements 205 and 206 of the fuzzy inference device D2, respectively and functions of the remaining elements 401 to 404 and 407 to 412 of the fuzzy inference device D4 are the same as those of the elements 301 to 304 and 308 to 313 of the fuzzy inference device D3, respectively, description of functions of all the elements 401 to 412 is abbreviated for the sake of brevity.

Hereinbelow, operational steps of the fuzzy inference device D4 are described. Since steps 1, 2 and 4 to 6 of the fuzzy inference device D4 are the same as those of the fuzzy inference device D3, their description is abbreviated for the sake of brevity. Thus, only step 3 is described.

(Step 3)

In the cluster core calculator 405, a distance from input and output data $(x_i^s, y_i^s)$ to a core (center of cluster) obtained for each inference rule by clustering is obtained and is normalized. The cluster core calculator 405 is operated in the same manner as the cluster core calculator 205 of the fuzzy inference device D2. Normalization degree is expressed by $W_i^s$. In the antecedent membership function generator 406, the degree $W_i^s$ is defined as the membership value of the antecedent.

By the above described arrangement of the fuzzy inference device D4, the inference rules are changed adaptively and fuzzy inference possesses learning function. Meanwhile, since the antecedent is determined by using statistical processing and the consequent is learned by using non-linear search method, follow-up speed is raised and memory capacity is reduced as compared with those of learning method employing a neural network, etc.

As will be seen from the foregoing description of the fourth embodiment of the present invention, since structure of the antecedent of the fuzzy inference rules is identified by employing non-linear characteristics of a neural network and the parameter of the consequent is determined by non-linear search method, it is possible to provide inference operational quantity which is adaptable to changing inference environments at high speed and flexibly at low memory capacity. Therefore, every operator can be satisfied with the fuzzy inference device of the present invention at all times.

Meanwhile, in the first and second embodiments of the present invention, pattern search method, method of rotating directions, etc. which enable search even if output of true values is not necessary are used for search of the parameter of the consequent but may also be replaced by random search method, feasible direction method and cutting plane method.

Furthermore, in the third and fourth embodiments of the present invention, steepest descent method which enables search by formulating the evaluation function by the use of errors is used for search of the parameter of the consequent but may also be replaced by Newton's method, etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A fuzzy inference device for determining an inference operational quantity from system input variables and output variables in accordance with inference rules each constituted by an antecedent and a consequent, comprising:

an inference rule determiner having means for receiving data denoting the system input variables and output variables and including a a variable reducing processor which receives data of the input variables and reduces a quantity of the input variables to determine a number of the input variables, b an evaluator for evaluating the determined number of the input variables performed by said variable reducing processor, c a cluster generator which receives data of the input variables determined by said variable reducing processor and the output variables, and formulates a plurality of data groups so as to determine a number of fuzzy inference rules by determining representative data of each of the data groups, d a cluster evaluator for determining the fuzzy inference rules in said cluster generator;

an antecedent neural element, operatively coupled to said inference rule determiner, including e a standard membership generator for generating learning data to determine a membership function of an antecedent of fuzzy inference by using input data belonging to each of the fuzzy inference rules determined by said cluster generator, f a neural network learner which has a learning function of a neural network which is set according to the learning data generated in said standard membership generator, g an antecedent membership function generator for determining a shape of the membership function by using the learning data in said standard membership generator and the learning function in said neural network learner;

a situational change processor, operatively coupled to said inference rule determiner, including h an initialization determiner for determining an initial value of a search parameter to determine a real number of a consequent of fuzzy inference by using the input data and output data belonging to each of the fuzzy inference rules determined by said cluster generator, i a search mover for moving the search parameter along each of search axes from the initial value in said initialization determiner, j a pattern searcher for increasing a motion distance of the search parameter in said search mover; an inference operational quantity determiner, operatively coupled to said antecedent neural element and to said situational change processor, which performs fuzzy inference by using the membership function in said antecedent membership function generator and the search parameter in said pattern searcher to determine the inference operational quantity; and an overall evaluator, operatively coupled to said inference operational quantity determiner, for evaluating, in accordance with an evaluation criterion, the inference operational quantity outputted by said inference operational quantity determiner.

2. A fuzzy inference device for determining an inference operational quantity from system input variables and output variables in accordance with inference rules each constituted by an antecedent and a consequent, comprising:

an inference rule determiner having means for receiving the system input variables and including a a variable reducing processor which receives data of the input variables and reduces a quantity of the input variables so as to determine a number of the input variables, b an evaluator for evaluating the determined number of the input variables performed by said variable reducing processor, c a cluster generator which receives data of the input variables determined by said variable reducing processor and formulates a plurality of data groups so as to determine a number of fuzzy inference rules by determining representative data of each of the data groups, d a cluster evaluator for determining the fuzzy inference rules in said cluster generator;

an antecedent neural element,, operatively coupled to said inference rule determiner, including e a standard membership generator for generating learning data to determine a membership function of an antecedent of fuzzy inference by using input data belonging to each of the fuzzy inference rules determined by said cluster generator, f a neural network learner which has a learning function of a neural network which is set according to the learning data generated in said standard membership generator, g an antecedent membership function generator for determining a shape of the membership function by using the learning data in said standard membership generator and the learning function in said neural network learner;

an output data divider, operatively coupled to said inference rule determiner, for dividing data of the output variables into output data portions such that each of the output data portions corresponds to each of the fuzzy inference rules determined by said cluster generator of said inference rule determiner;

a situational change processor, operatively coupled to said inference rule determiner, including h an initialization determiner for determining an initial value of a search parameter to determine a real number of a consequent of fuzzy inference by using the input data and output data in said output data divider, i a gradient vector determiner for calculating a difference of inference accuracy for the search parameter by starting from the initial value in said initialization determiner, j a consequent calculator for calculating a real number of the consequent on the basis of the difference calculated by said gradient vector determiner;

an inference operational quantity determiner, operatively coupled to said antecedent neural element and to said situational change processor, which performs fuzzy inference by using the membership function in said antecedent membership function generator and the real number in said consequent calculator to determine the inference operational quantity; and an overall evaluator, operatively coupled to said inference operational quantity determiner, for evaluating, in accordance with an evaluation criterion, the inference operational quantity outputted by said inference operational quantity determiner.

* * * * *